(12) United States Patent  
Kirino et al.

(10) Patent No.: US 6,746,749 B2  
(45) Date of Patent: Jun. 8, 2004

(54) MAGNETIC RECORDING DISK

(75) Inventors: Fumiyoshi Kirino, Tokyo (JP); Nobuyuki Inaba, Hasuda (JP); Hiroki Yamamoto, Hitachi (JP); Ken Takahashi, Tokai (JP); Takashi Naitou, Hitachiota (JP); Motoyasu Terao, Hinode (JP); Sumio Hosaka, Hinode (JP); Eiji Koyama, Tsuchiura (JP); Hiroki Kuramoto, Yokohama (JP)

(73) Assignees: Hitachi, Ltd., Tokyo (JP); Hitachi Maxell, Ltd., Ibaraki (JP)

( * ) Notice: Subject to any disclaimer, the term of this patent is extended or adjusted under 35 U.S.C. 154(b) by 16 days.

(21) Appl. No.: 10/230,290

(22) Filed: Aug. 29, 2002

(65) Prior Publication Data

US 2002/0197516 A1 Dec. 26, 2002

Related U.S. Application Data

(63) Continuation of application No. 09/604,633, filed on Jun. 27, 2000, now Pat. No. 6,472,047.

(30) Foreign Application Priority Data

Jun. 28, 1999 (JP) .............................. 11-181434  
Jun. 28, 1999 (JP) .............................. 11-181434

(51) Int. Cl.$^7$ ................................ G11B 5/66
(52) U.S. Cl. .................. 428/116; 428/212; 428/323; 428/409; 428/694 TS; 428/697; 428/701; 428/702
(58) Field of Search ................. 428/116, 212, 428/323, 409, 694 TS, 697, 701, 702, 900; 360/110, 131

(56) References Cited

U.S. PATENT DOCUMENTS

| | | |
|---|---|---|
| 4,652,499 A | 3/1987 | Howard |
| 5,378,548 A | 1/1995 | Torii et al. |
| 5,658,659 A | 8/1997 | Chen et al. |
| 5,851,643 A | 12/1998 | Honda et al. |
| 6,114,056 A | 9/2000 | Inomata et al. |
| 6,139,950 A | 10/2000 | Wu et al. |
| 6,210,544 B1 | 4/2001 | Sasaki |
| 6,218,003 B1 | 4/2001 | Wu et al. |
| 6,221,508 B1 | 4/2001 | Kanbe et al. |
| 6,238,809 B1 | 5/2001 | Wu et al. |

FOREIGN PATENT DOCUMENTS

| | | |
|---|---|---|
| JP | 57-18025 A | 1/1982 |
| JP | 11-306532 A | 11/1999 |

OTHER PUBLICATIONS

Derwent Translation of JP–57–018025–A (Derwent Acc. No. 1982–18608E).  
JPO Translation of JP–11–306532–A (JPO Image JP411306532A).

*Primary Examiner*—Paul Thibodeau  
*Assistant Examiner*—Kevin M. Bernatz  
(74) *Attorney, Agent, or Firm*—Kenyon & Kenyon

(57) ABSTRACT

The magnetic recording medium includes an underlayer 12 formed of an inorganic compound layer, and a magnetic layer 13 formed over the underlayer 12. The inorganic compound layer as the underlayer 12 has crystal grains and at least one kind of oxide, the crystal grains having as main elements at least one of cobalt oxide, chromium oxide, iron oxide and nickel, the at least one kind of oxide lying as a non-crystalline phase in grain boundaries between the crystal grains and selected from among silicon oxide, aluminum oxide, titanium oxide, tantalum oxide and zinc oxide.

4 Claims, 8 Drawing Sheets

XIB-XIB

MAGNETIC RECORDING DISK

CROSS-REFERENCE TO RELATED APPLICATION

This application is a continuation of U.S. patent application Ser. No. 09/604,633 filed Jun. 27, 2000, now U.S. Pat. No. 6,472,047, and also relates to U.S. patent application Ser. No. 09/604,132, filed on Jun. 27, 2000, now U.S. Pat. No. 6,534,206, and based on Japanese Patent Application Serial No. 11-181434 filed Jun. 28, 1999, the disclosures of which are incorporated herein by reference.

BACKGROUND OF THE INVENTION

The present invention relates to an information recording medium for reading and writing a large volume of information at high speed and with high precision, and more specifically to a magnetic recording medium for a magnetic disk, a substrate for the magnetic recording medium, and a magnetic storage apparatus, all having high performance and high reliability.

DESCRIPTION OF THE RELATED ART

Recent years have seen a remarkable advance of sophisticated information society and multimedia combining a variety of forms of information have found a widespread use. One of information recording apparatus that support these developments is a magnetic recording disk drive. At present, efforts are being made to reduce the size of the magnetic recording disk drive while at the same time improving its recording density. The magnetic recording disk drive is also experiencing a rapid cost reduction. To realize high recording density of the magnetic recording disk, the following essential requirements must be met: (1) the distance between the magnetic recording disk and the magnetic head should be reduced; (2) coercivity of the medium should be increased; and (3) a signal processing method should be improved.

The magnetic recording medium among others requires an increased coercivity to realize a high density recording. In addition, to realize a recording density in excess of 10 Gb/in$^2$ requires a reduction in a unit area in which magnetization reversal occurs. For that purpose, magnetic crystal grains must be reduced in size to a microfine level. Further, in addition to the grain size reduction of magnetic crystal grains, it is important in terms of thermal fluctuation to reduce the extent of grain size distribution. To meet these requirements, it has been proposed to provide a shield thin layer under a magnetic layer. One such example is U.S. Pat. No. 4,652,499.

SUMMARY OF THE IVNENTION

In the related technology described above, there is a limitation to the control on the distribution of crystal grain size of the information recording magnetic layer and there are cases where fine grains and coarse grains coexist. The coexistence of fine and coarse grains poses problems when magnetization is reversed to record information. Small grains are influenced by leakage fields from surrounding magnetic crystal grains, while large grains interact with the surrounding magnetic crystal grains, so that ultra-high density magnetic recording in excess of 10 GB/inch$^2$ may not be performed in stable condition.

To overcome these problems, an object of the present invention is to provide a substrate or platelike body suited for manufacturing a high performance magnetic recording medium. Another object of the present invention is to provide a high performance magnetic recording medium with little noise by refining the crystal grain size in a magnetic layer. Still another object of the present invention is to provide a magnetic recording medium with low noise, low thermal fluctuation and low thermal demagnetization by suppressing the dispersion of the crystal grain size distribution. A further object of the present invention is to provide a magnetic recording medium suited for high density recording by controlling the crystallographic orientation of the magnetic layer. A further object of the present invention is to provide a high density magnetic recording medium by reducing the magnetic interaction among magnetic grains to reduce the magnetization reversal unit for recording and erasure. A further object of the present invention is to provide a magnetic storage apparatus suited for high density magnetic recording.

The above objectives can be achieved by: forming an inorganic compound layer over the substrate, the inorganic compound layer including crystal grains having as main elements at least one of cobalt oxide, chromium oxide, iron oxide and nickel oxide and at least one kind of oxide lying as a non-crystalline phase in boundaries between the crystal grains and selected from among silicon oxide, aluminum oxide, titanium oxide, tantalum oxide and zinc oxide; and forming a magnetic layer over the inorganic compound layer, the magnetic layer having a structure in which magnetic crystal grains are epitaxially grown from the surface of the crystal grains of the inorganic compound layer and a non-magnetic element or compound exists in grain boundaries between the magnetic crystal grains. Alternatively, it is possible to form the substrate from the inorganic compound and epitaxially grow the magnetic crystal grains of the magnetic layer over the substrate.

The crystal grains in the inorganic compound layer have a columnar structure with the crystallographic orientation, in which the columns extend in the layer thickness direction. It is preferred that the crystal grains have a uniform size when viewed in the in-plane direction of the inorganic compound layer, that the grain size distribution be a normal distribution, and that the standard deviation of the grain size distribution be 10% or less of the average grain size. The inorganic compound layer typically has a honeycomb structure in which hexagonal crystal grains are regularly arrayed two-dimensionally in the in-plane direction. When one crystal grain is considered, it is preferred that the number of crystal grains neighboring that one crystal grain in the in-plane direction be almost constant and the number of crystal grains surrounding (or adjoining) it two-dimensionally be between 5.7 and 6.3. Such a structure of the inorganic compound layer can be controlled by changing a ratio between a material forming a crystalline phase and a material forming a noncrystalline phase and a composition of the material forming the non-crystalline phase when the inorganic compound layer is formed.

The crystal grains in the substrate formed of the inorganic compound have at least near the surface of the substrate a columnar structure with a crystallographic orientation in which the columns extend in the direction of thickness of the substrate. The columnar structure is surrounded by a non-crystalline phase. It is preferred that in a plane near and parallel to the surface of the substrate the crystal grains be almost uniform in size, that their grain size distribution be a normal distribution and that the standard deviation of the grain size distribution be 10% or less of the average grain size. At least on the substrate surface, the substrate typically has a honeycomb structure in which hexagonal crystal grains are regularly arrayed two-dimensionally in a plane parallel to the substrate surface. When one crystal grain on the substrate surface is considered, it is preferred that the number of crystal grains neighboring that one crystal grain be almost constant and the number of crystal grains surrounding (or adjoining) it two-dimensionally be between 5.7 and 6.3. Such a structure of the substrate can be controlled by changing a ratio between a material forming a crystalline phase and a material forming a noncrystalline phase and a composition of the material forming the non-crystalline phase when the substrate is formed of an inorganic compound.

Over the substrate of inorganic compound or the inorganic compound layer having the characteristics described above, a magnetic layer is formed. In this case, it is advantageous that the magnetic crystal grains of the magnetic layer are epitaxially grown from the crystal grains of the inorganic compound substrate or inorganic compound layer. Surrounding the crystal grains of the crystal grains of the substrate or inorganic compound layer is a non-crystalline phase. The magnetic layer grows epitaxially over the underlying crystal grains and its epitaxial growth is suppressed over the non-crystalline phase. Because the growth mechanism of the magnetic layer over the crystal grains differs from that over the grain boundaries when the magnetic layer is grown, the orientation and structure of the magnetic layer change in the in-plane direction. This change leads to a change in magnetic characteristics, which is effective in reducing the magnetic interaction among the magnetic crystal grains.

To enable smooth epitaxial growth of the magnetic crystal grains in the magnetic layer, the difference between the lattice constant of the crystal grains in the inorganic compound substrate surface or the inorganic compound layer and the lattice constant of the magnetic crystal grains needs to be ±10% or less. Although it cannot be said definitively because the inner stress in the layer varies depending on the deposition apparatus and deposition conditions, if the mismatch in the lattice constant between the crystal grains of the inorganic compound layer (or substrate) and the magnetic crystal grains of the magnetic layer exceeds ±10%, a layer with an intermediate lattice constant may be provided between the inorganic compound layer (or substrate) and the magnetic layer to epitaxially grow the magnetic crystal grains. In this case, it is preferred that the intermediate layer have the same crystal structure as the magnetic layer and the inorganic compound layer (or substrate).

Epitaxially growing the magnetic crystal grains of the magnetic layer from the crystal grains in the inorganic compound layer (or inorganic compound substrate) allows the shape and grain size of the magnetic crystal grains to match those of the crystal grains of the inorganic compound layer (or substrate). This means that the grain size and shape of the magnetic crystal grains of the magnetic layer can be determined by the inorganic compound layer or the substrate.

As described above, the grain size in the in-plane direction of the crystal grains in the inorganic compound layer (or inorganic compound substrate) can be selected arbitrary by controlling the composition and manufacturing process. Further, because the grain size distribution of the crystal grains in the inorganic compound layer (or substrate) is significantly small and the crystal grains are arrayed regularly, it is possible to control the grain size distribution and grain arrangement of the magnetic crystal grains in the magnetic layer formed over the inorganic compound layer. As a result, noise, thermal fluctuation and thermal demagnetization resulting from the medium can be reduced substantially. The grain-to-grain distance in the inorganic compound layer (or substrate) can be changed easily by controlling the composition of the compound. The control of the grain-to-grain distance can reduce the magnetic interaction among the magnetic crystal grains. With the method described above, the magnetization reversal unit in the magnetic recording medium can be minimized.

The features of the present invention are summarized as follows.

A platelike body of the present invention, which comprises a substrate and an inorganic compound layer formed over the substrate, is characterized in that the inorganic compound layer includes crystal grains having as main elements at least one of cobalt oxide, chromium oxide, iron oxide and nickel oxide and at least one kind of oxide lying as a non-crystalline phase in grain boundaries between the crystal grains and selected from silicon oxide, aluminum oxide, titanium oxide, tantalum oxide and zinc oxide. This platelike body can be used to manufacture a magnetic recording medium by depositing a magnetic layer over the platelike body.

The crystal grains in the inorganic compound layer have a columnar structure with the columns extending in the layer thickness direction. It is preferred that the inorganic compound layer, when viewed along its surface, have 5.7 to 6.3 crystal grains on average surrounding each crystal grain. Typically, it has a honeycomb structure in which hexagonal crystal grains in the inorganic compound layer are arrayed regularly two-dimensionally in the in-plane direction.

The crystal grains in the inorganic compound layer can be made to have a grain size distribution whose standard deviation is 10% or less of the average grain size when viewed in the in-plane direction. Further, the crystal grains in the inorganic compound layer can be made to exhibit almost the same crystallographic orientation. The width of grain boundaries between the crystal grains in the inorganic compound layer can be set in the range between 0.5 nm and 2 nm. It is desired that the thickness of the inorganic compound layer be between 10 nm and 100 nm. The lower limit of the layer thickness is determined by the thickness at which the layer can be formed stably and the upper limit by the inner stress of the layer.

The inorganic compound substrate of this invention is characterized in that at least one kind of oxide selected from among silicon oxide, aluminum oxide, titanium oxide, tantalum oxide and zinc oxide exists as a non-crystalline phase in grain boundaries between crystal grains, the crystal grains having as main elements at least one of cobalt oxide, chromium oxide, iron oxide and nickel oxide. When viewed along the surface of the inorganic compound substrate, it is preferred that 5.7 to 6.3 crystal grains on average surround one crystal grain. The crystal grains have at least near the surface of the substrate a columnar structure with the columns extending in the substrate thickness direction. This inorganic compound substrate can be used to manufacture a magnetic recording medium by depositing a magnetic layer over the substrate.

A magnetic recording medium of the invention, which includes a substrate, and an underlayer formed over the substrate and a magnetic layer formed directly over the underlayer or through a layer having a composition different from that of the underlayer, is characterized in that the underlayer is an inorganic compound layer which includes crystal grains having as main elements at least one of cobalt oxide, chromium oxide, iron oxide and nickel oxide, and at least one kind of oxide lying as a non-crystalline phase in grain boundaries between the crystal grains and selected from among silicon oxide, aluminum oxide, titanium oxide, tantalum oxide and zinc oxide.

It is preferred that the inorganic compound layer, when viewed in the in-plane direction, have 5.7 to 6.3 crystal grains on average surrounding each crystal grain. Typically, the inorganic compound layer has a honeycomb structure in which hexagonal crystal grains are regularly arrayed two-dimensionally in the in-plane direction. It is preferred that the crystal grains in the inorganic compound layer have a grain size distribution whose standard deviation is 10% or less of the average grain size when viewed in the in-plane direction. It is also preferred that the inorganic compound layer have a thickness of between 10 nm and 100 nm. The lower limit of the layer thickness is determined by the thickness at which the layer can be formed stably and the upper limit by the inner stress of the layer.

The magnetic layer can include magnetic crystal grains and non-magnetic element or compound present in grain boundaries between the magnetic crystal grains and have 5.7 to 6.3 magnetic crystal grains surrounding each magnetic crystal grain. The magnetic layer typically has a honeycomb structure in which hexagonal magnetic crystal grains are regularly arrayed two-dimensionally in the in-plane direction.

It is possible to have the magnetic crystal grains in the magnetic layer exist in areas corresponding to the crystal grains of the inorganic compound layer and have the non-magnetic element or compound exist in areas corresponding to the grain boundary phase of the inorganic compound layer. This can be realized by epitaxially growing the magnetic layer over the inorganic compound layer. The magnetic crystal grains in the magnetic layer can have a grain size distribution whose standard deviation is 10% or less of the average grain size when viewed in the in-plane direction, reflecting the structure of the inorganic compound layer. Similarly, the width of the grain boundaries between the magnetic crystal grains in the magnetic layer can be set in a range between 0.5 nm and 2 nm, reflecting the structure of the inorganic compound layer.

The magnetic recording medium of this invention, which includes a substrate, an underlayer formed over the substrate and a magnetic layer formed over the underlayer, is characterized in that the underlayer is an inorganic compound layer which includes crystal grains having as main elements at least one of cobalt oxide, chromium oxide, iron oxide and nickel oxide, and at least one kind of oxide lying as a non-crystalline phase in grain boundaries between the crystal grains and selected from among silicon oxide, aluminum oxide, titanium oxide, tantalum oxide and zinc oxide. The magnetic layer includes magnetic crystal grains made of cobalt or alloy having cobalt as its main element. The magnetic crystal grains of the magnetic layer can be epitaxially grown over the crystal grains of the underlayer.

The magnetic recording medium of this invention, which includes a circular disk substrate, an underlayer formed on the substrate and a magnetic layer formed over the underlayer, is also characterized in that the underlayer is an inorganic compound layer which includes crystal grains having as main elements at least one of cobalt oxide, chromium oxide, iron oxide and nickel oxide and at least one kind of oxide lying as a non-crystalline phase in grain boundaries between the crystal grains and selected from among silicon oxide, aluminum oxide, titanium oxide, tantalum oxide and zinc oxide, and which has 5.7 to 6.3 crystal grains surrounding each crystal grain. The magnetic recording medium is also characterized in that between the underlayer and the magnetic layer is formed a thin layer which has a lattice constant differing by 10% or less from both the lattice constants of the crystal grains of the underlayer and the magnetic crystal grains of the magnetic layer. The magnetic crystal grains of the magnetic layer can be epitaxially grown over the crystal grains of the thin layer.

The magnetic layer can be a ferromagnetic layer of an alloy having cobalt as its main element and including at least two additional elements chosen from Cr, Pt, Ta, Nb, Pd, B, Si, Ti, V, Ru and Rh. The magnetic layer can have at least one of elements Cr, Ta and Nb precipitated within or near the grain boundaries between cobalt crystal grains.

The magnetic recording medium of this invention, which includes a substrate and a magnetic layer formed over the substrate, is characterized in that the substrate is an inorganic compound substrate in which at least one kind of oxide selected form silicon oxide, aluminum oxide, titanium oxide, tantalum oxide and zinc oxide exists as a non-crystalline phase in grain boundaries between crystal grains, the crystal grains having as main elements at least one of cobalt oxide, chromium oxide, iron oxide and nickel oxide, and that the magnetic layer includes magnetic crystal grains made of cobalt or an alloy having Co as its main element.

The magnetic recording medium of this invention, which includes a substrate and a magnetic layer formed over the substrate, is characterized in that the substrate is an inorganic compound substrate in which at least one kind of oxide selected form silicon oxide, aluminum oxide, titanium oxide, tantalum oxide and zinc oxide exists as a non-crystalline phase in grain boundaries between crystal grains, the crystal grains having as main elements at least one of cobalt oxide, chromium oxide, iron oxide and nickel oxide, and that the magnetic layer includes magnetic crystal grains made of cobalt or an alloy having Co as its main element and at least one kind of oxide lying as a noncrystalline phase in grain boundaries between magnetic crystal grains and selected from among silicon oxide, aluminum oxide, titanium oxide, tantalum oxide and zinc oxide.

The magnetic recording medium of this invention, which includes a substrate, an underlayer formed over the substrate and a magnetic layer formed over the underlayer, is characterized in that the underlayer is an inorganic compound layer which includes crystal grains having as main elements at least one of cobalt oxide, chromium oxide, iron oxide and nickel oxide and at least one kind of oxide lying as a non-crystalline phase in grain boundaries between the crystal grains and selected from among silicon oxide, aluminum oxide, titanium oxide, tantalum oxide and zinc oxide, and that the magnetic layer includes magnetic crystal grains made of Co or an alloy having Co as its main element and at least one kind of oxide lying as a non-crystalline phase in grain boundaries between the magnetic crystal grains and chosen from silicon oxide, aluminum oxide, titanium oxide, tantalum oxide and zinc oxide. The magnetic crystal grains of the magnetic layer can be epitaxially grown over the crystal grains of the underlayer. The alloy for the magnetic layer with cobalt as a main element can be an alloy containing cobalt with at least one additional element selected from Pt, Pd, Gd, Tb, Dy, Ho, Cr, Sm, Nd and Y It is preferred that the magnetic layer have the (11.0) plane of Co oriented parallel to the surface of the layer. It should be noted that this index representation uses a notation system of four index representation that omits a third term and that the omitted third term is a value satisfying (first term value)+(second term value)−(third term value)=0.

The substrate over which the underlayer is formed can use a glass substrate and a metal substrate formed of aluminum or aluminum alloy. Alternatively, a substrate having an NiP layer formed over glass, aluminum or aluminum alloy may be used.

The magnetic recording medium of this invention, which includes a circular disk substrate and a magnetic layer formed over the substrate, is also characterized in that the substrate is an inorganic compound substrate which includes crystal grains having as main elements at least one of cobalt oxide, chromium oxide, iron oxide and nickel oxide and at least one kind of oxide lying as a non-crystalline phase in grain boundaries between the crystal grains and selected from among silicon oxide, aluminum oxide, titanium oxide, tantalum oxide and zinc oxide, and which has 5.7 to 6.3 crystal grains surrounding each crystal grain. The magnetic recording medium is also characterized in that between the substrate and the magnetic layer is formed a thin layer which has a lattice constant intermediate between the lattice constant of the crystal grains of the substrate and the lattice constant of the magnetic crystal grains of the magnetic layer. The difference in lattice constant between the underlayer and the magnetic layer can be mitigated by setting the lattice constant of the thin layer formed between the under layer and the magnetic layer in such a manner that its difference from both the lattice constant of the crystal grains of the underlayer and the lattice constant of the magnetic crystal grains of the magnetic layer is within 10%.

In a magnetic storage apparatus which comprises a magnetic recording medium, a magnetic recording medium driver for driving the magnetic recording medium, a magnetic head for writing into and reading from the magnetic recording medium, a head access system for driving the magnetic head, and a read/write signal processing system for processing the read/write signals to and from the magnetic head, the magnetic storage apparatus of this invention uses the magnetic recording medium that has been described above.

The present invention can provide a high performance magnetic recording medium with little noise and with low thermal fluctuation and low thermal demagnetization by suppressing the dispersion of crystal grain size in the magnetic layer and refining the crystal grains. As a result, ultrahigh density magnetic recording medium in excess of 20 GB/inch$^2$ can be manufactured.

In this specification, when, as a result of the X-ray diffraction analysis on a specimen, a diffraction peak due to a crystal plane appears, i.e., the specimen is crystalline with respect to X-ray, the specimen is referred to as being crystalline (or in a crystalline phase). When no diffraction peak due to the crystal plane appears, the specimen is referred to as being amorphous or non-crystalline.

DETAILED DESCRIPTION OF THE EMBODIMENTS

Now embodiments of the present invention will be described by referring to the accompanying drawings.

Embodiment 1

Figure 1:
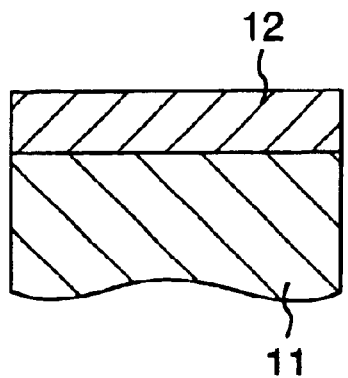
FIG. 1 is a schematic view showing a cross-sectional structure of a platelike body.

FIG. 1 is a schematic view showing a cross-sectional structure of a platelike body fabricated according to this embodiment. An inorganic compound layer 12 was deposited over a glass substrate 11 to a thickness of 30 nm by sputtering. In depositing the inorganic compound layer 12, a target was used which was made by mixing a CoO powder and a SiO$_2$ powder in a molar ratio of 2:1 and sintered. Pure argon (Ar) was used for a discharge gas. In the sputtering, the Ar pressure was 3 mTorr and the RF power applied was 500 W/150 mm$\phi$.

Figure 2:
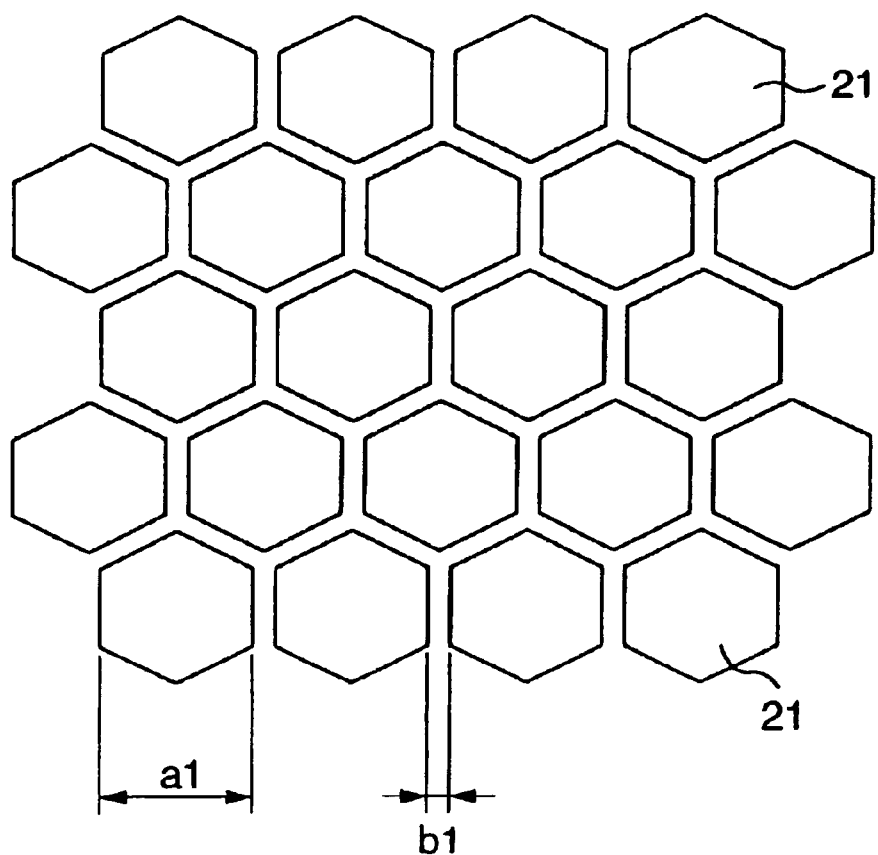
FIG. 2 is a schematic view showing a surface of an inorganic compound layer as observed by a transmission electron microscope (TEM).

FIG. 2 is a schematic view showing the surface of the deposited inorganic compound layer 12 as observed by a transmission electron microscope (TEM). Kirino as shown in this figure, the inorganic compound layer 12 has a honeycomb structure in which regular hexagonal crystal grains 21 are regularly arrayed two-dimensionally.

Figure 3:
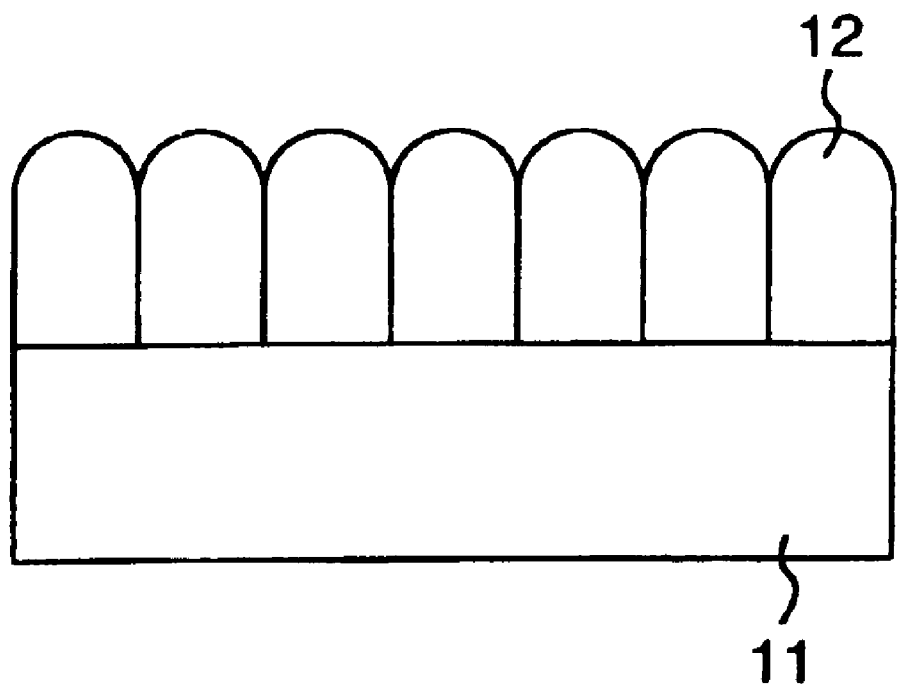
FIG. 3 is a schematic view showing a cross-sectional structure of the inorganic compound layer.

FIG. 3 is a schematic view showing the cross section of the inorganic compound layer 12 as observed by the TEM. As shown in FIG. 3, the cross section of the inorganic compound layer 12 exhibits a columnar structure vertically rising from the glass substrate 11. It is found that the columnar structure is grown without the crystal grains becoming large or changing their sizes.

Figure 4:
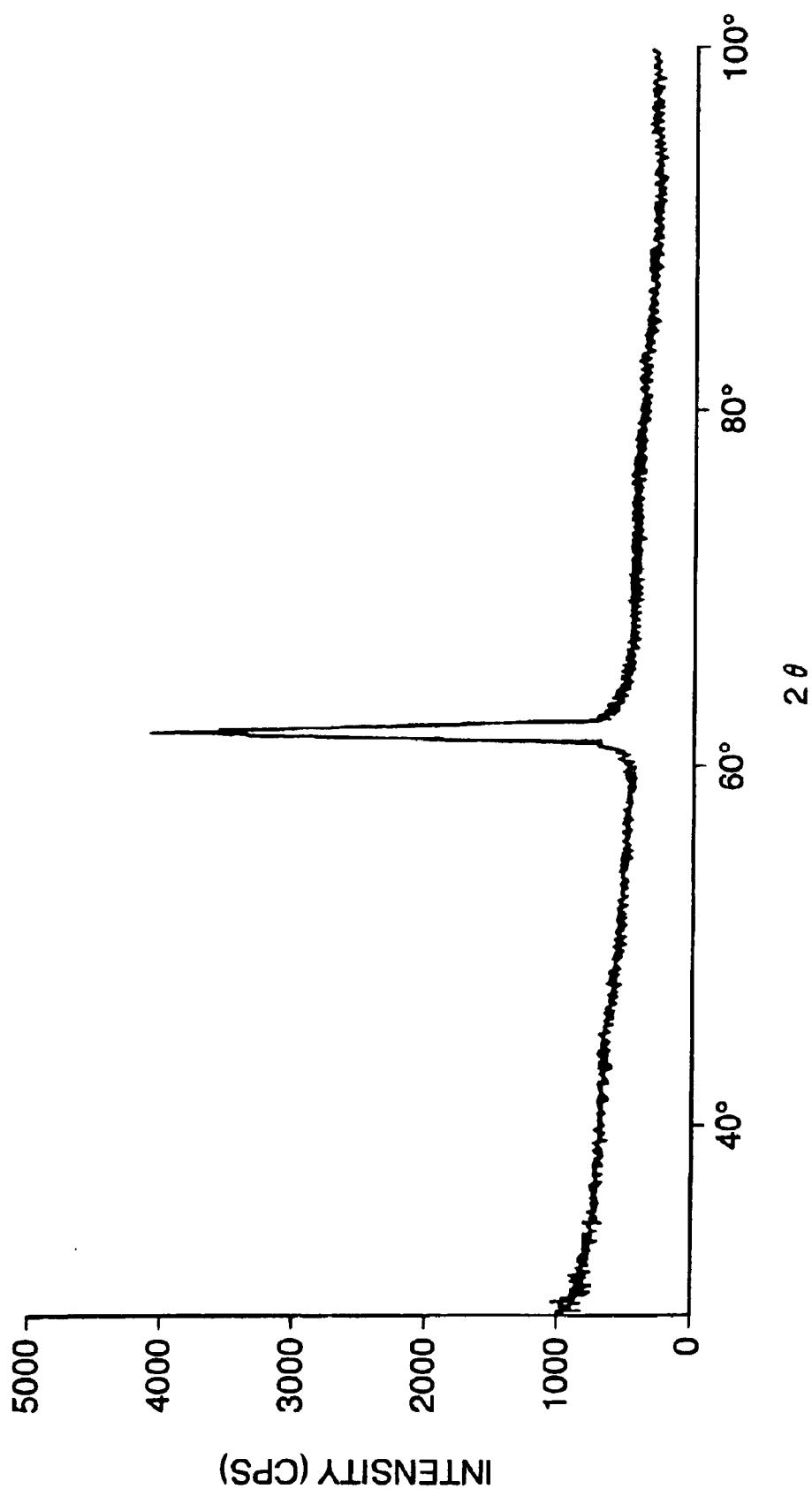
FIG. 4 is a diagram showing an X-ray diffraction profile of the inorganic compound layer.

The examination of crystal grains 21 and their boundaries by a microfine-area EDX analysis ($\mu$-EDX analysis) has found that the crystal grains 21 are oxides of cobalt (Co) and that SiO$_2$ exists in their boundaries. The crystal structure of the inorganic compound layer 12 was examined by the θ-2θ X-ray diffraction analysis and an X-ray diffraction profile as shown in FIG. 4 was obtained. The abscissa in FIG. 4 represents an angle of 2θ and the ordinate represents a relative value of X-ray diffraction intensity. As shown in the figure, a diffraction peak of the (220) plane of CoO is observed at around 2θ=62.5°, with no other peaks. Observation of the lattice image has found that the cobalt oxide is crystalline and the silicon oxide is non-crystalline. The crystalline-amorphous mixed crystal state and the crystallographic orientation can be changed arbitrarily by controlling the deposition condition and composition. The lattice constant determined was found to be almost equal to that of Co. The lattice constant can be controlled by changing the deposition condition or by adding to CoO those metals with ion radii different from that of CoO (e.g., chromium, iron or nickel) or oxides of these metals.

Next, a grain size distribution of the crystal grains 21 was measured by the following procedure. A TEM surface image obtained by the TEM observation was loaded as image information into a computer and 250 crystal grains were picked up at random from the grain image that was observed in the same field of view. Image processing is performed on each of the selected crystal grains by the computer to extract outlines of the individual grains, and areas enclosed by the outlines are calculated to determine the areas occupied by the individual crystal grains. The crystal grains observed by the TEM have an almost regular hexagonal shape and thus the grains are assumed to be a regular hexagon in shape. Based on the area of each grain obtained by the image processing, the sides of each grain are calculated to determine the grain size (distance between opposing parallel sides) al. From these crystal grain sizes, the number of grains with the grain size of between 5 nm or more and less than 6 nm, the number of grains with the grain size of between 6 nm or more and less than 7 nm, the number of grains with the grain size of between 7 nm or more and less than 8 nm, and so on, are counted to determine a frequency distribution of each crystal grain size. This grain size distribution was subjected to statistical processing to determine a mean value of the crystal grain size and a standard deviation of the grain size distribution. The grain size distribution is a normal distribution, with an average grain diameter a1 of 10 nm and a standard deviation $\sigma$ of 0.9 nm. The distance between the crystal grains (distance between almost parallel sides of adjacent crystal grains) b1 was 0.5 to 1.0 nm.

Next, by using the TEM surface image of the inorganic compound layer, the number of crystal grains existing around one crystal grain was determined according to the following procedure. The TEM surface image obtained as a result of the TEM image observation was loaded as image information into the computer, which then processes the image to extract the outlines of the grain boundary portions. From this outline image 250 crystal grains were picked up randomly to count the number of crystal grains existing adjacent to each crystal grain, i.e., a coordination number of each crystal grain. The coordination numbers thus obtained were counted to determine the number of crystal grains having a coordination number of 5, the number of crystal grains having a coordination number of 6, the number of crystal grains having a coordination number of 7, and so on, to determine a distribution of coordination number frequency. The coordination number distribution thus obtained was subjected to a statistical processing to determine an average coordination number. The examination of 250 crystal grains found the average coordination number to be 6.02 grains. The fact that 6.02 crystal grains on average exist around each grain also supports the assumption that hexagonal crystal grains of similar sizes are arrayed two-dimensionally in a regular pattern to form a honeycomb structure.

As shown in the schematic view of FIG. 2, when the distance between the nearly parallel sides of adjacent crystal grains is defined as a distance between the crystal grains b1, the distance b1 between the crystal grains 21 can be adjusted to a desired value by changing the target composition (ratio between CoO and $SiO_2$, etc.). Then, the number of crystal grains surrounding one crystal grain changes depending on the grain-to-grain distance b1. For example, when the $SiO_2$ concentration is lowered, the grain-to-grain distance decreases (grains come closer to each other). At the same time, disturbances in the grain shape are observed. Some crystal grain has approximately 7 grains around it and some has 4 to 5 grains, increasing variations. Further, the reduction in the $SiO_2$ concentration resulted in the two-dimensional array of the crystal grains 21 being disturbed, collapsing the honeycomb structure. In this way, it can be seen that the amorphous material present between the crystal grains 21 plays an important role in ensuring that the structure of the inorganic compound layer 12 has regularity.

While this embodiment uses as a target a sintered mixture of CoO powder and $SiO_2$ powder, it is possible to make the target in the form of sintered bodies of these single compounds and deposit a layer by a two-element simultaneous sputtering. The structure of the inorganic compound layer 12 did not depend on the deposition method and the kind of target. The similar effects were obtained when chromium oxide, iron oxide or nickel oxide was used instead of CoO. Further, the use of aluminum oxide, titanium oxide, tantalum oxide or zinc oxide in place of the silicon oxide also produced the similar effects. With the use of a mixture of silicon oxide and zinc oxide, the crystal grain interval b1 can be controlled by changing the mixture ratio. Further, the substrate 11 may be changed in size, may be formed of aluminum or aluminum alloy, or may be formed by plating NiP over glass, aluminum or aluminum alloy. With the use of these substrates, the inorganic compound layer 12 having the similar honeycomb structure was obtained.

Embodiment 2

Figure 5:
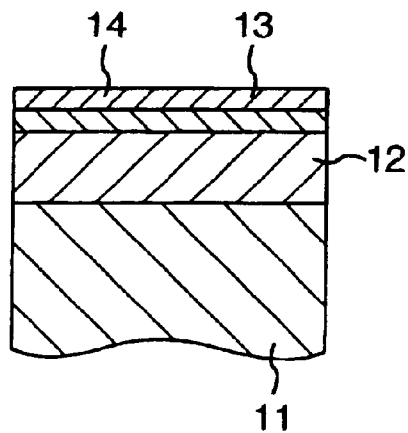
FIG. 5 is a schematic cross section of a magnetic recording disk.

A magnetic recording disk was manufactured by depositing a magnetic layer over the inorganic compound layer formed in the embodiment 1. FIG. 5 is a schematic cross section of a magnetic recording disk according to this embodiment.

Over a glass substrate 2.5" in diameter, which is the substrate 11 of the magnetic recording disk, an inorganic compound layer 12 was deposited to a thickness of 30 nm by the method similar to that of the embodiment 1. This thickness is determined considering an overall inner stress in the magnetic recording medium and is enough to prevent peeling from the substrate 11. This inorganic compound layer 12 has the structure explained in the embodiment 1. That is, as shown in FIG. 2, the layer 12 has a honeycomb structure in which almost regular hexagonal crystal grains 21 made of cobalt oxide are regularly arranged in a two-dimensional pattern, with amorphous $SiO_2$ present in the boundaries between the crystal grains 21. The grain size distribution of the crystal grains 21 was a normal distribution, with the crystal grains 21 measuring 10 nm on average in size a1 (between parallel opposing sides) and the standard deviation $\sigma$ of the grain size distribution being 0.9 nm. The grain-to-grain distance b1 was 0.5 to 1.0 nm. The number of crystal grains adjoining one grain is 6.02 on average.

A $Co_{69}Cr_{19}Pt_{12}$ layer was sputtered over the inorganic compound layer 12 to a thickness of 15 nm to form a magnetic layer 13. In forming the magnetic layer 13, a Co—Cr—Pt alloy was used for a target and pure Ar for a discharge gas. The Ar pressure during the sputtering was 3 mTorr and the DC power applied was 1 kW/150 mm$\phi$.

Figure 6:
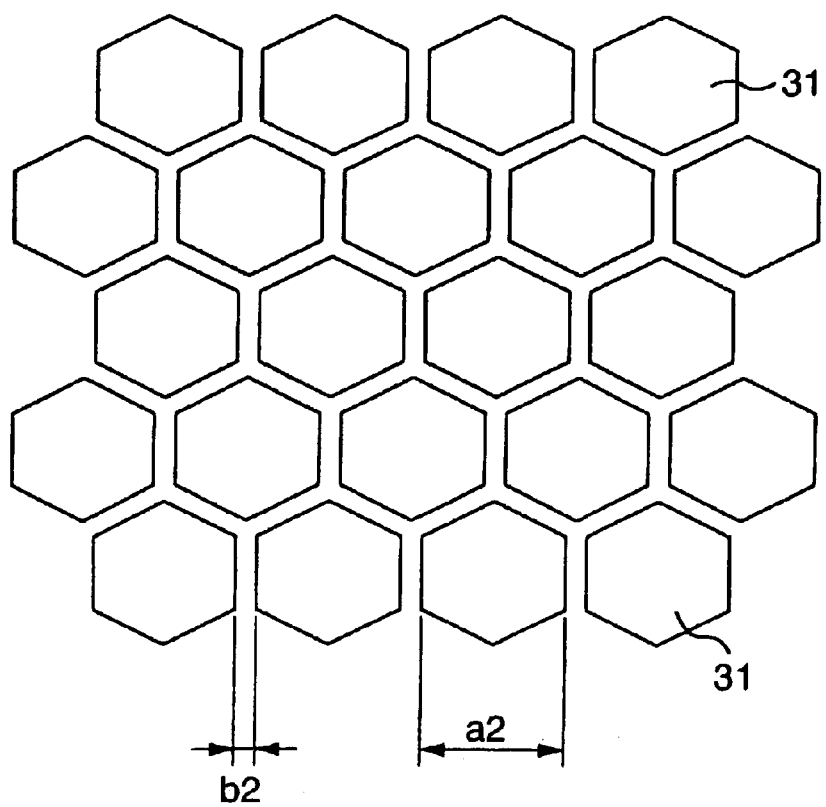
FIG. 6 is a schematic view showing a surface of a magnetic layer as observed by the TEM.

The examination of the surface of the magnetic layer 13 by TEM revealed that, as shown in FIG. 6, the magnetic layer 13 has a honeycomb structure in which almost regular hexagonal crystal grains 31 are regularly arranged two-dimensionally, reflecting the structure of the inorganic compound layer 12. The TEM image of the surface of the magnetic layer 13 was loaded as image information into the computer and a method similar to that of the embodiment 1 was used to determine an average of the size a2 of the crystal grains 31 and a grain size distribution. The average size of the crystal grains 31 was 10 nm and the standard deviation σ of the grain size distribution was 0.9 nm. The grain-to-grain distance b2 was 0.5 to 2.0 nm. These show that the crystal grains of the magnetic layer 13 are microfine and that the grain size distribution is narrow. In these respects, the magnetic layer 13 is similar to the inorganic compound layer 12.

Next, using a method similar to that of the embodiment 1, the number of crystal grains surrounding one crystal grain 31 was determined. Examination of 250 grains showed that the average coordination number was 6.01 grains, which represents a good agreement with the average coordination number of the inorganic compound layer 12. This shows that hexagonal magnetic crystal grains 31 of similar sizes are grown continuously over the crystal grains 21 of the inorganic compound layer 12 and therefore are regularly arrayed two-dimensionally to form a honeycomb structure.

Figure 7:
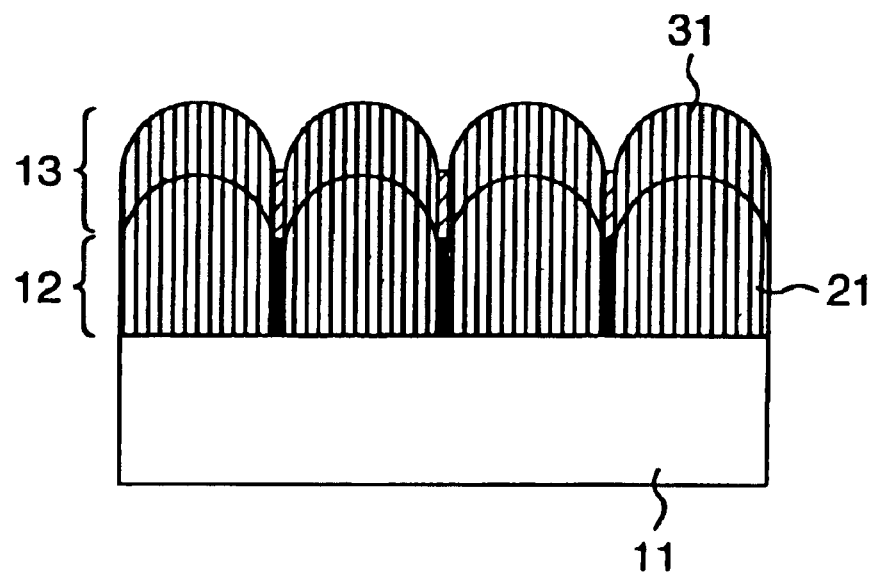
FIG. 7 is a schematic view showing a cross-sectional structure of an inorganic compound layer and a magnetic layer.

Observation of the cross section by TEM revealed that, as shown in FIG. 7, there is lattice continuation between the inorganic compound layer 12 and the magnetic layer 13 (i.e., between vertical lines shown in the crystal grains 21 of the inorganic compound layer 12 and vertical lines shown in the magnetic crystal grains 31 of the magnetic layer 13). This indicates that the magnetic crystal grains 31 of the magnetic layer 13 are epitaxially grown from the crystal grains 21 of the inorganic compound layer 12. It is also found that the growth mechanism of the magnetic layer in the crystalline phase is different from that of the grain boundary phase and that these phases have different metal structures. A good columnar structure was observed to be grown over the crystal grains 21 of the inorganic compound layer 12, and a structure observed over the grain boundary phase of the inorganic compound layer 12 is different from the columnar structure grown over the crystal grains. The structure formed over the grain boundary phase is known to exhibit a non-magnetic behavior. The examination of the magnetic layer 13 with an X-ray diffraction analysis revealed peaks of diffraction intensity at around $2\theta=62.5°$ and $2\theta=74°$. In specimens having only the inorganic compound layer 12, not the magnetic layer 13, formed over the substrate, the diffraction intensity peak was observed only at around $2\theta=62.5°$. This indicates that the peak is considered to be a diffraction peak from the (220) plane of the CoO crystal grains present in the inorganic compound layer. The peak observed at around $2\theta=74°$, on the other hand, may be explained as follows with the TEM observation result also taken into consideration. It is considered that the magnetic crystal grains had a hexagonal close-packed structure (or hcp) and a diffraction peak from the (11.0) plane was observed. This result means that the (11.0) plane of the magnetic layer is strongly orientated to be parallel to the layer surface.

Examination of composition distribution in the in-plane direction of the magnetic crystal grains by using the μ-EDX has found that, compared with the average composition of the magnetic layer, the Cr concentration in the grain boundary portion increases about 5% whereas it decreases about 4% inside the grain in the vicinity of the boundary.

Measurement of the magnetic characteristic of the magnetic layer 13 shows that the coercivity was 3.5 kOe, Isv was $2.5\times10^{-16}$ emu, and S, which is the measure of squareness of hysteresis in M-H loop, was 0.8 and S* was 0.86, showing that the magnetic layer 13 had a good magnetic characteristic. The reason that the measure of the squareness is large (hysteresis is close to square) is that because the magnetic layers grown over the crystalline phase and the grain boundary phase of the inorganic compound layer 12 have different growth mechanisms, reflecting the structure of the inorganic compound layer 12, the interaction among the magnetic crystal grains 31 is mitigated.

Finally, a carbon layer as a protective layer 14 was deposited over the magnetic layer 13 to a thickness of 5 nm by sputtering. As to the sputtering conditions, an applied DC power density was 1 kW/150 mmφ and a discharge gas pressure was 5 mTorr. Although Ar was used as a sputtering gas, a gas including nitrogen may also be used. This method refines the grains and thus the layer obtained becomes finer, improving the protective performance. It should be noted that the quality of the protective layer depends largely on the sputtering apparatus as well as the sputtering method and thus the above-described conditions and procedure are not absolute.

Figure 11A:
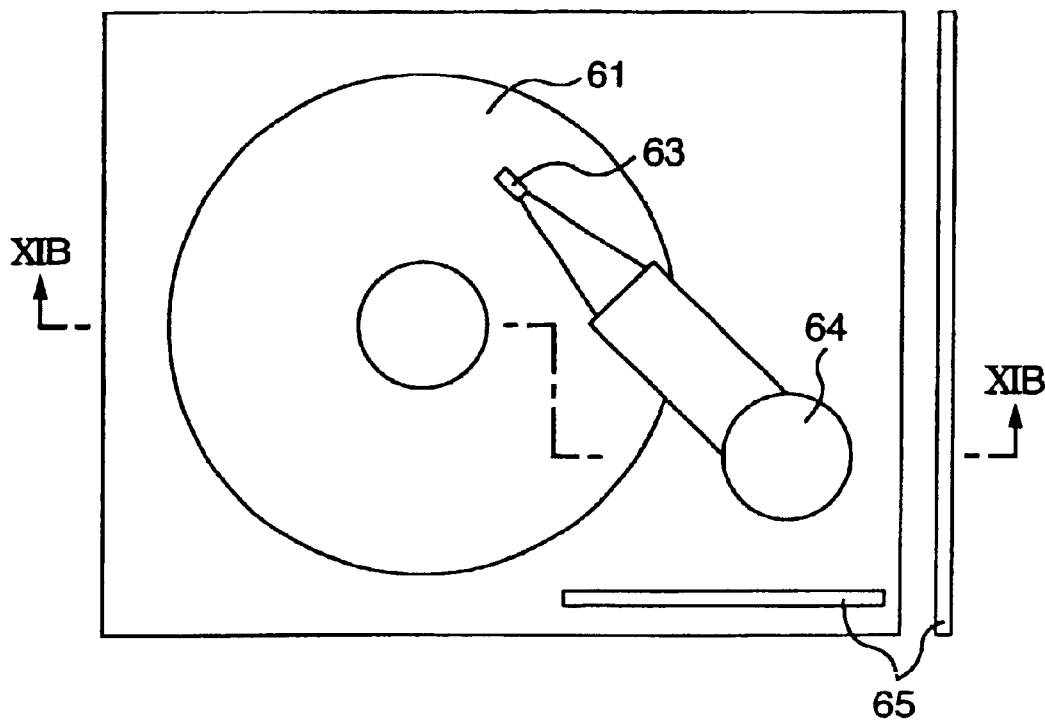
FIG. 11A is a schematic plan view of a magnetic recording disk drive.
Figure 11B:
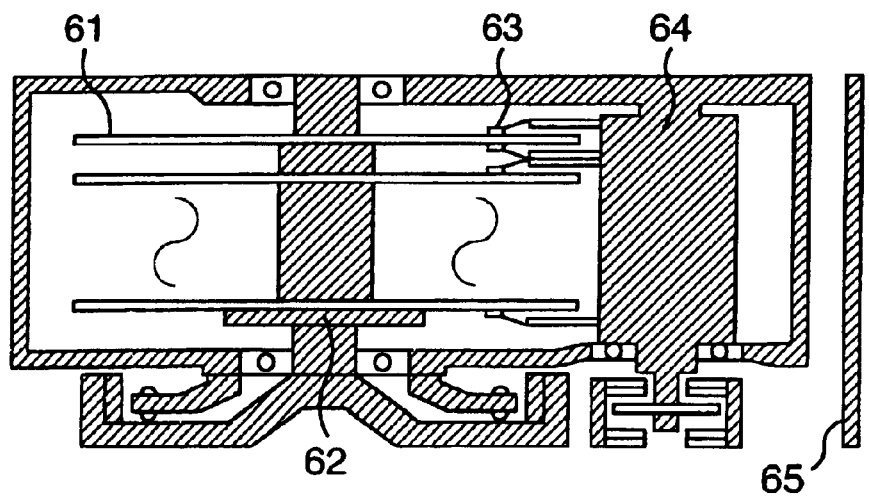
FIG. 11B is a cross section taken along the line XIB—XIB of FIG. 1A.

To the surface of the magnetic recording disk manufactured in this manner, a high molecular agent having a normal chain structure with a molar weight of 3000 or more was applied as a lubricant. The disk was then incorporated into a magnetic recording disk drive schematically shown in FIGS. 11A and 11B and the read/write characteristics of the magnetic recording disk were evaluated. As shown in FIG. 11A, which represents a schematic plan view, and in FIG. 11B, which illustrates a cross section taken along the line XIB—XIB of FIG. 11A, the magnetic recording disk drive has a known construction, which includes a magnetic recording disk 61 rotated by a magnetic recording disk drive 62; a magnetic head 63 driven by a magnetic head drive 64 to write into and read from the magnetic recording disk 61; and a read/write signal processing system to process a read signal from and a write signal to the magnetic head 63. For a writing operation a magnetic head having a soft magnetic layer with a high saturation magnetic flux density of 2.1T was used, and for a reading operation a magnetic head utilizing a giant magnetoresistive effect was used. The gap between the head surface and the magnetic layer was 20 nm. The S/N of the disk was examined by recording a signal equivalent to 20 GB/inch$^2$ onto the magnetic recording disk 61, and a read output of 32 dB was obtained.

Here, a magnetic force microscope (MFM) was used to measure a magnetization reversal unit. The magnetization reversal unit was found to be of a size equivalent to two or three magnetic grains, which is sufficiently small. It was also found that a zigzag pattern present in the magnetization transition region was significantly smaller than those found in the media of the related art. Another test was performed in which a signal equivalent to 20 GB/in$^2$ was written into the magnetic recording disk 61 by using the magnetic head 63 and in which the recorded pattern was read out immediately after the write operation and 2000 hours after the write operation and the intensities of these signals read out were compared. The intensity of the signal read out 2000 hours after the write operation was 98% of the output signal read immediately after the write operation, indicating that the recorded signal suffered almost no degradation and no attenuation caused by thermal fluctuations and thermal demagnetization. This is due to the fact that the grain size distribution of the magnetic crystal grains 31 in the magnetic layer 13 is narrow. The measurement of error rate of this disk showed that it was $1\times10^{-5}$ or less when no signal processing was performed.

Embodiment 3

Figure 8:
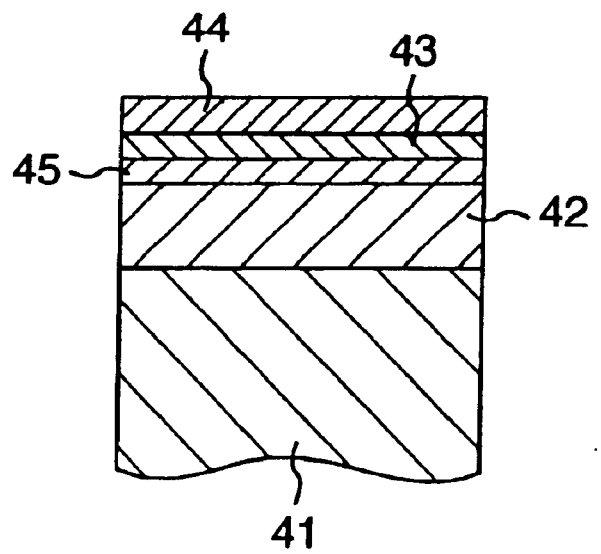
FIG. 8 is a schematic cross section of a magnetic recording disk.

Next, we will describe a magnetic recording disk in which the lattice constant of crystal grains of the inorganic compound layer formed over the substrate is more than 10% different from the lattice constant of crystal grains of the magnetic layer. FIG. 8 shows a schematic cross section of a magnetic recording disk manufactured in this embodiment.

A glass substrate 41 of 2.5" in diameter was used as the substrate of the magnetic recording disk. A mixture of CoO powder and ZnO powder in a molar ratio of 3:1 was used as a target and an inorganic compound layer 42 was deposited by sputtering over the substrate 41 under the same conditions as in the embodiment 1 to a thickness of 30 nm. This thickness is determined considering an overall inner stress in the magnetic recording medium and is enough to prevent peeling from the substrate 11.

The observation of the surface of the inorganic compound layer 42 by TEM revealed a honeycomb structure in which, as shown in FIG. 2, almost regular hexagonal crystal grains 21 were regularly arrayed two-dimensionally. The TEM image of the surface of the inorganic compound layer 42 was loaded as image information into the computer, which determined an average size a1 of the crystal grains 21 and a grain size distribution in a manner similar to that of the embodiment 1. The average size of the crystal grains 21 was 10 nm and the standard deviation a of the grain size distribution was 0.9 nm. The grain-to-grain distance b1 was 1.5 to 2.0 nm. Next, the number of crystal grains neighboring one crystal grain 21 was determined in a manner similar to that of the embodiment 1. Examination on 250 crystal grains showed that 6.01 grains on average surrounded each grain, which represents a good agreement with the coordination number of the inorganic compound layer of the embodiment 1.

The lattice constant of CoO of the crystal grains 21 were 20% larger than the lattice constant of the magnetic film formed over the inorganic compound layer. The crystal grains 21 of the inorganic compound layer 12 are the same as those of the embodiment 1, but the lattice constant as well as the grain size can be changed in this way.

An analytical electron microscope having an EDX analyzer with a space resolution of 2 nm was used to examine the composition in the in-plane direction of the crystal grains of the inorganic compound layer 12. The composition was not uniform in the in-plane direction, and in the amorphous portion between the crystal grains there was mainly Zn, with Co only partly observed. In the crystal grains there was mainly Co, with Zn only partly observed. Because the crystal grain size is sufficiently larger than the space resolution of the analyzer, the Zn observed inside the crystal grains means that Zn exists in the crystal grains and that ZnO is dissolved in CoO in a solid state.

Hence, prior to forming the magnetic layer, a $Cr_{58}Ti_{15}$ alloy layer, which has a lattice constant intermediate between the lattice constant of crystal grains of the inorganic compound layer 42 and the lattice constant of crystal grains of the magnetic layer, was formed as a lattice constant control layer 45 to a thickness of 50 nm. The Cr—Ti alloy can change its lattice constant arbitrarily from the lattice constant of Cr by controlling the Ti concentration. This allows the lattice constant difference between the inorganic compound layer 42 and the magnetic layer to be suppressed to within 10%. In forming the lattice constant control layer 45, the target used was made of a Cr—Ti alloy and the discharge gas used as pure Ar. The Ar pressure during sputtering was 3 mTorr and the applied DC power was 1 kW/150 mm$\phi$. The lattice constant of the Cr85Ti15 alloy layer was checked by sputtering the $Cr_{58}Ti_{15}$ alloy layer over the Si wafer substrate to a thickness of about 100 nm, and by calculating the lattice constant based on the reflected peak from the (11.0) plane obtained by the θ-2θ X-ray diffraction analysis of the thin layer specimen. The lattice constant was found to be 2.92 Å.

A $Co_{69}Cr_{19}Pt_{12}$ film was formed as a magnetic layer 43 over the lattice constant control layer 45 to a thickness of 12 nm. The target was a Co—Cr—Pt alloy and the discharge gas was pure Ar. The Ar pressure during the sputtering was 3 mTorr and the applied DC power was 1 kW/150 mm$\phi$.

The examination of the structure of the magnetic layer 43 by the X-ray diffraction analysis found that the (11.0) plane of Co was strongly oriented to be parallel to the surface of the layer. The observation of the surface of the magnetic layer 43 by TEM revealed that it has a honeycomb structure consisting of almost regular hexagonal crystal grains 31 regularly arranged two-dimensionally, as shown in FIG. 6.

The TEM image of the surface of the magnetic layer 43 was loaded as image information into the computer, and the method similar to that of the embodiment 1 was used to determine the average of the size a2 of the crystal grains 31 and the grain size distribution. The average size of the crystal grains 31 was 10 nm and the standard deviation σ of the grain size distribution was 0.9 nm. The grain-to-grain distance b2 was 1.5 to 2.0 nm. The observation of the cross section by TEM found that the crystal grains 31 of the magnetic layer 43 were epitaxially grown over the crystal grains of the inorganic compound layer 42. The magnetic layer 43 has a good columnar structure and it is also found that the size of the crystal grains does not change in the in-plane direction from the substrate surface to the medium surface. Next, the number of crystal grains present adjacent to one crystal grain 31 was checked. Examination of 250 crystal grains showed that the average coordination number was 6.01 grains.

Measurement of magnetic characteristics of the magnetic layer 43 showed that the coercivity was 3.0 kOe, Isv was $2.5 \times 10^{-16}$ emu, and S, which is the measure of squareness of hysteresis in M-H loop, was 0.81 and S* was 0.85, indicating that the magnetic layer 43 has a good magnetic characteristic.

Finally, a carbon layer as a protective layer 44 was deposited to a thickness of 5 nm. As to the sputtering conditions the applied DC power density was 1 kW/150 mm$\phi$ and the discharge gas pressure was 5 mTorr. Although Ar was used as a sputtering gas, a gas including nitrogen may also be used.

To the surface of the magnetic recording disk manufactured in this manner, a high molecular agent having a normal chain structure with a molar weight of 3000 or more was applied as a lubricant. The disk was then incorporated into a magnetic recording disk drive schematically shown in FIG. 11 and the read/write characteristics of the magnetic recording disk were evaluated. For a writing operation a magnetic head having a soft magnetic layer with a high saturation magnetic flux density of 2.1T was used, and for a reading operation a magnetic head utilizing a giant magnetoresistive effect was used. The gap between the head surface and the magnetic layer was 20 nm. The S/N of the disk was examined by recording a signal equivalent to 20 GB/inch$^2$ onto the magnetic recording disk, and a read output of 32 dB was obtained. A magnetic force microscope (MFM) was used to measure a magnetization reversal unit. The magnetization reversal unit was found to be of a size equivalent to two or three magnetic grains, which is sufficiently small. It was also found that a zigzag pattern present in the magnetization transition region was significantly smaller than those found in the media of the related art.

Another test was performed in which a signal equivalent to 20 GB/in² was written into the magnetic recording disk by using the magnetic head and in which the recorded pattern was read out immediately after the write operation and 2000 hours after the write operation and the intensities of these signals read out were compared. The intensity of the signal read out 2000 hours after the write operation was 99% of the output signal read immediately after the write operation, indicating that the recorded signal suffered almost no degradation and no attenuation caused by thermal fluctuations and thermal demagnetization. This is due to the fact that the grain size distribution in the magnetic layer is narrow. The measurement of error rate of this disk showed that it was $1 \times 10^{-5}$ or less when no signal processing was performed.

Although in this embodiment cobalt oxide was used as a material to form the crystalline phase of the inorganic compound layer 42, the similar effects were produced when iron oxide or nickel oxide was used instead of cobalt oxide. Further, while zinc oxide was used as a material to form the amorphous phase, the similar effects were obtained when aluminum oxide, titanium oxide, tantalum oxide or silicon oxide was used instead of zinc oxide. Substrates of different sizes formed of glass, aluminum or aluminum alloy were used and still the similar effects were obtained.

Embodiment 4

An example case of controlling the lattice constant of a crystalline phase in the inorganic compound layer will be explained. The manufactured magnetic recording disk has a cross-sectional structure shown in the schematic view of FIG. 5.

A glass substrate 2.5" across was used as the substrate 11 of the magnetic recording disk. An inorganic compound layer 12 was formed over the substrate 11 by simultaneous sputtering using two different targets, one of which is a sintered mixture of CoO and $Fe_2O_3$ in a molar ratio of 3:1 and the other is ZnO. The inorganic compound layer 12 was deposited to a thickness of 30 nm by adjusting the sputtering power so that the ratio of sputtering rates or deposition rates of the former and latter targets would be 2:1. Pure Ar was used for the discharge gas and the Ar pressure during the sputtering was set at 3 mTorr.

The TEM observation of the surface of the inorganic compound layer 12 thus formed revealed a honeycomb structure in which almost regular hexagonal crystal grains 21 were regularly arrayed two dimensionally, as schematically illustrated in FIG. 2. The TEM image of the surface of the inorganic compound layer 12 was loaded as image information into the computer which then determined the average of the size a1 of the crystal grains 21 and the grain size distribution by a method similar to that of the embodiment 1. The average size of the crystal grains 21 was 10 nm and the standard deviation σ of the grain size distribution was 0.9 nm. The grain-to-grain distance b1 was 0.5 to 1.0 nm. Next, using a method similar to that of the embodiment 1, the number of crystal grains neighboring one crystal grain 21 was determined. Examination of 250 crystal grains showed that 6.01 grains on average surrounded each grain, which represents a good agreement with the coordination number of the inorganic compound layer of the embodiment 1.

The crystal grains 21 had iron between cobalt oxide lattices. Zinc oxide was found at the grain boundary. Observation of the lattice image showed that the cobalt oxide was crystalline and zinc oxide was non-crystalline. The lattice constant of the crystalline portion was found to be 2.196 Å, which is larger than that of CoO. It is understood that the lattice constant can be controlled by adding iron oxide to the CoO—ZnO system.

A $Co_{69}Cr_{19}Pt_{12}$ layer was formed as the magnetic layer 13 over the inorganic compound layer 12 to a thickness of 12 nm. The A Co—Cr—Pt alloy was used as the target and pure Ar was used as the discharge gas. The Ar pressure during sputtering was set at 3 mTorr and the applied DC power at 1 kW/50 mmφ.

Examination of the structure of the magnetic layer 13 with the X-ray diffraction analysis showed that the (11.0) plane of Co was strongly oriented to be parallel to the layer surface. The lattice constants of the inorganic compound layer 12 and the magnetic layer 13 were almost equal at 2.14 Å.

Examination of the surface of the magnetic layer 13 with TEM revealed a honeycomb structure in which almost regular hexagonal crystal grains were regularly arrayed two-dimensionally, as schematically illustrated in FIG. 6. The TEM image of the surface of the magnetic layer 13 was loaded as image information into the computer which then determined the average of size a2 of the crystal grains 31 and the grain size distribution using a method similar to that of the embodiment 1. The average size of the crystal grains 31 was 10 nm and the standard deviation σ of the grain size distribution was 0.9 nm. These show that the crystal grains of the magnetic layer 13 is microfine and that the extent of the grain size distribution is narrow. The grain-to-grain distance b2 was 1.5 to 2.0 nm. Next, using a method similar to that of the embodiment 1, the number of crystal grains surrounding one crystal grain 31 was determined. Examination of 250 grains showed that the average coordination number was 6.01 grains, which represents a good agreement with the average coordination number of the inorganic compound layer 12. This shows that hexagonal magnetic crystal grains 31 of similar sizes are grown continuously over the crystal grains of the inorganic compound layer and therefore are regularly arrayed two-dimensionally to form a honeycomb structure.

The observation of the cross section by TEM found that the inorganic compound layer 12 and the magnetic layer 13 were epitaxially grown and that the size of the crystal grains 31 in the magnetic layer 13 was equal to that of the crystal grains 21 in the inorganic compound layer 12. Further, their cross-sectional structures were found to be a good columnar structure, with the grain size remaining unchanged from the substrate surface to the medium surface.

Measurement of magnetic characteristics of the magnetic layer 13 showed that the coercivity was 3.5 kOe, Isv was $2.5 \times 10^{-16}$ emu, and S, which is the measure of squareness of hysteresis in M-H loop, was 0.8 and S* was 0.86, indicating that the magnetic layer has a good magnetic characteristic.

Finally, a carbon layer as a protective layer 14 was deposited over the magnetic layer 13 to a thickness of 5 nm. As to the sputtering conditions, the applied DC power density was 1 kW/50 mmφ and the discharge gas pressure was 5 mTorr. Although Ar was used as a sputtering gas, a gas including nitrogen may also be used.

To the surface of the magnetic recording disk manufactured in this manner, a high molecular agent having a normal chain structure with a molar weight of 3000 or more was applied as a lubricant. The disk was then incorporated into a magnetic recording disk drive schematically shown in FIG. 11 and the read/write characteristics of the magnetic recording disk were evaluated. For a writing operation a magnetic head having a soft magnetic layer with a high saturation magnetic flux density of 2.1T was used, and for a reading operation a magnetic head utilizing a giant magnetoresistive effect was used. The gap between the head surface and the magnetic layer was 20 nm. The S/N of the disk was examined by recording a signal equivalent to 20 GB/inch$^2$ onto the magnetic recording disk, and a read output of 32 dB was obtained. A magnetic force microscope (MFM) was used to measure a magnetization reversal unit. The magnetization reversal unit was found to be of a size equivalent to two or three magnetic grains, which is sufficiently small. It was also found that a zigzag pattern present in the magnetization transition region was significantly smaller than those found in the media of the related art.

Another test was conducted in which a signal equivalent to 20 GB/in$^2$ was written into the magnetic recording disk by using the magnetic head and in which the recorded pattern was read out immediately after the write operation and 2000 hours after the write operation and the intensities of these signals read out were compared. The intensity of the signal read out 2000 hours after the write operation was 97% of the output signal read immediately after the write operation, indicating that the recorded signal suffered almost no degradation and no attenuation caused by thermal fluctuations and thermal demagnetization. This is due to the fact that the grain size distribution in the magnetic layer is narrow. The measurement of error rate of this disk showed that it was $1 \times 10^{-5}$ or less when no signal processing was performed.

Although in this embodiment iron oxide was contained in cobalt oxide to control the lattice constant of the crystal grains 21, it is also possible to control the lattice constant of the crystal grains of the inorganic compound layer 12 by using chromium oxide or nickel oxide instead of iron oxide. The kind and amount of a compound to be added to a compound forming the crystalline phase need only to be determined according to the lattice constant of the crystal grains in the magnetic layer used. Further, while zinc oxide was used as an oxide constituting the non-crystalline phase, the similar effects were obtained when the zinc oxide was replaced with aluminum oxide, titanium oxide, tantalum oxide or silicon oxide. Substrates of different sizes formed of glass, aluminum or aluminum alloy were used and still the similar effects were obtained.

Embodiment 5

An example case in which the grain-to-grain distance is controlled by controlling a material forming the non-crystalline phase in the inorganic compound layer will be described.

Using the two-element simultaneous sputtering, an inorganic compound layer was formed over a glass substrate to a thickness of 30 nm. The material of a target used to form a crystalline phase was sintered CoO and the material of a target used to form a non-crystalline phase was a sintered mixture of 3:1 $SiO_2$ and ZnO in a molar ratio. The composition of the inorganic compound layer can be controlled by the electric power applied to the two targets. The discharge gas used pure Ar and the Ar pressure during the sputtering was set at 3 mTorr. The applied RF power was adjusted so that the ratio of the sputtering rates or deposition rates of the Coo and $SiO_2$—ZnO would be 2:1.

The TEM observation of the surface of the inorganic compound layer thus obtained revealed a honeycomb structure in which almost regular hexagonal crystal grains 21 were regularly arrayed two-dimensionally, as schematically illustrated in FIG. 2. The TEM image of the surface of the magnetic layer 13 was loaded as image information into the computer which then determined the average of the size a1 of the crystal grains 21 and the grain size distribution by a method similar to that of the embodiment 1. The average size of the crystal grains 21 was 10 nm and the standard deviation σ of the grain size distribution was 0.8 nm. There was a grain boundary phase about 1 nm thick around the crystal grains 21. The examination by the μ-EDX of the crystal grains and the grain boundary phase found that the crystal grains 21 were oxide of cobalt and what was present in the grain boundary was silicon oxide and zinc oxide. Next, using a method similar to that of the embodiment 1, the number of crystal grains neighboring one crystal grain 21 was determined. Examination of 250 crystal grains showed that 6.01 grains on average surrounded each grain, which represents a good agreement with the coordination number of the inorganic compound layer 12.

The distance between crystal grains 21 (grain boundary distance) b1 can be controlled by changing the ratio of a material forming the crystalline phase and a material forming the non-crystalline phase, or by changing the composition of the material forming the non-crystalline phase. For example, in this embodiment the grain-to-grain distance was changed by changing the ratio of V1 and V2, where V1 is a deposition rate of CoO, the material to form the crystalline phase, and V2 is a deposition rate of $SiO_2$—ZnO, the material to form the non-crystalline phase. As the V1 is increased compared with V2, the grain-to-grain distance b1 becomes shorter. When V1:V2=5:1, the grain-to-grain distance b1 was 0.5 nm. When V1 increases larger than this ratio of deposition rate, the non-crystalline portion between crystal grains became unclear and at the same time the honeycomb structure collapsed. Because the ratio between the material contained in the inorganic compound layer which forms the crystalline phase and the material which forms the non-crystalline phase agrees with the deposition rate of each material, the material contained in the inorganic compound layer that forms the non-crystalline portion must be ⅙ of the overall layer for the inorganic compound layer formed to maintain the honeycomb structure. On the other hand, when V2 is increased in comparison with V1, the grain-to-grain distance b1 widens. When V1:V2=1:5, the distance b1 is 3.0 nm. When the V2 is increased further from this ratio, crystal grains precipitate in circular forms within the noncrystalline phase, rather than the non-crystalline phase existing among the crystal grains. In this case, too, the honeycomb structure collapses as a result.

Controlling the grain-to-grain distance in the inorganic compound layer is important for the following reason. That is, as described in the embodiments 1 to 5, when epitaxially growing a magnetic layer over the inorganic compound layer to form a magnetic recording medium, it is important to reduce a magnetic interaction between the magnetic crystal grains. The ability to adjust the grain-to-grain distance makes it possible to control the magnetic interaction among the magnetic crystal grains. Particularly because the magnetic grains formed over the crystalline phase and those over the grain boundary phase have different compositions and structures, the magnetic characteristics of the magnetic layers differ correspondingly. The magnetic crystal grains epitaxially grown over the crystalline phase of the inorganic compound layer exhibited a good crystallinity, reflecting the structure of the crystal grains of the inorganic compound layer, whereas the magnetic layer over the grain boundary portion had random orientations and was close to the non-crystalline phase. As described above, the magnetic characteristics of the magnetic layer and the magnetic recording medium reflect the structure of the inorganic compound layer formed under the magnetic layer.

The magnetic layer, formed over the inorganic compound layer exhibits an ordinary hard magnetism over the crystal grains but, over the grain boundary phase, exhibits a nearly non-magnetic characteristic. According to this invention, one can easily control the magnetic interaction among the magnetic grains by using a simple method. The degree of the magnetic interaction varies depending on the grain-to-grain distance, so it is important to control the grain-to-grain distance.

Embodiment 6

Figure 9:
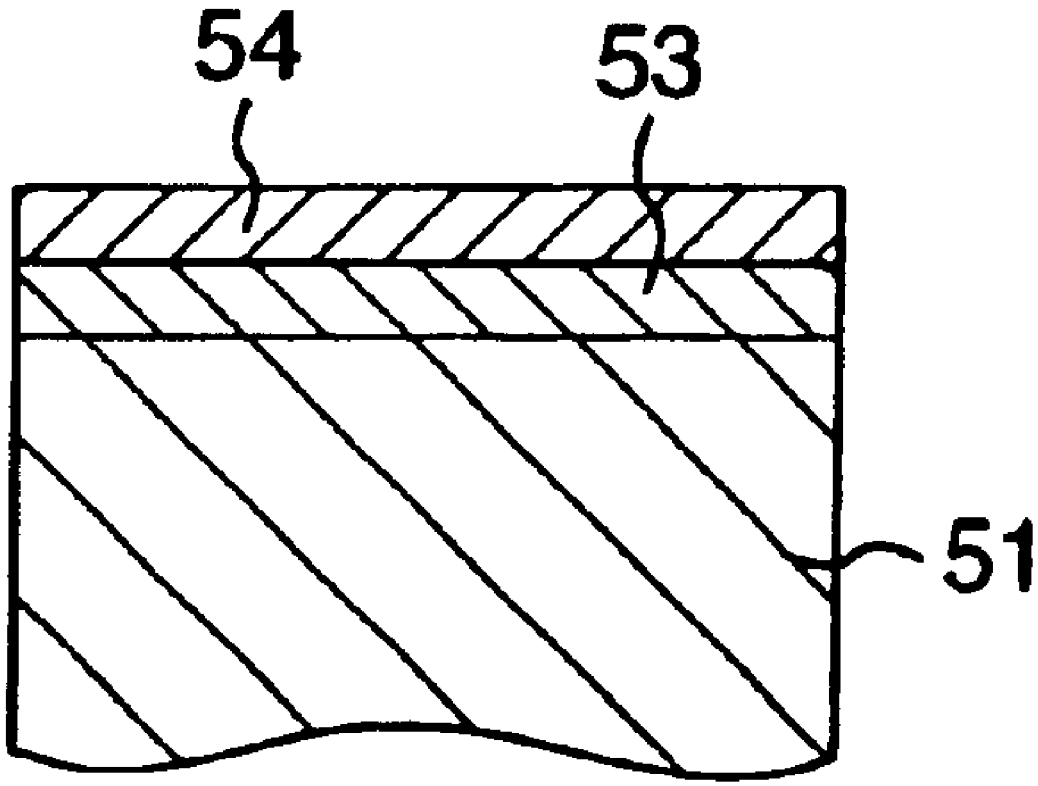
FIG. 9 is a schematic cross section of a magnetic recording disk.

A disk substrate was manufactured by using an inorganic compound with a regularly arrayed honeycomb structure and deposited with a magnetic layer to form a magnetic recording disk. FIG. 9 is a schematic cross section of a magnetic recording disk manufactured according to this embodiment. Although a substrate 51 used is a disk substrate 2.5" across, the size and shape of the substrate can be chosen arbitrarily.

The substrate 51 was manufactured as follows by using a mixture of CoO powder and $SiO_2$ powder as the material for the substrate. The CoO powder and $SiO_2$ powder were mixed in a molar ratio of 2:1 and this mixture was heated, melted and rolled into a plate which was then cooled. After being cooled down to a room temperature, the platelike material was cut in outer and inner diameters to a standard magnetic recording disk substrate size of 2.5 inches in diameter. The surface of the substrate was mirror polished by the standard glass polishing method and washed. Immediately before forming a magnetic layer over this substrate, the substrate surface was cleaned in a vacuum chamber by a reverse sputtering.

The TEM observation of the surface of the substrate 51 thus obtained revealed a structure as illustrated in FIG. 2. That is, on the surface of the substrate 51 was formed a honeycomb structure in which almost regular hexagonal grains 21 were regularly arrayed two-dimensionally. The TEM image of the surface of the substrate 51 was loaded as image information into the computer which then determined the average of the size a1 of the grains 21 and the grain size distribution by a method similar to that of the embodiment 1. The average size of the grains 21 was 15 nm and the standard deviation σ of the grain size distribution was 1.2 nm. The grain-to-grain distance b1 was 0.5 to 1.0 nm. The examination by the μ-EDX found that the grains 21 were oxide of cobalt and what was present around the grains 21 was silicon oxide. The observation of the lattice image showed that the cobalt oxide was crystalline and the silicon oxide was non-crystalline.

Next, using a method similar to that of the embodiment 1, the number of crystal grains neighboring one crystal grain 21 was determined. Examination of 250 crystal grains showed that 6.07 grains on average surrounded each grain, which represents a good agreement with the coordination number of the inorganic compound layer of the embodiment 1. Further, the lattice constant of the crystal grains 21 was determined to be almost equal to that of the magnetic grains of the magnetic recording medium.

As shown in FIG. 9, a $Co_{69}Cr_{19}Pt_{12}$ layer was formed as a magnetic layer 53 over the substrate 51 to a thickness of 12 nm. The target used was a Co—Cr—Pt alloy and the discharge gas used was pure Ar. The Ar pressure during the sputtering was set at 3 mTorr and the applied DC power was 1 kw/150 mmφ. The structure of this magnetic layer 53 was examined by the X-ray diffraction analysis. It was found that the (11.0) plane of Co was strongly oriented to be parallel to the layer surface. The TEM observation of the surface of the magnetic layer 53 revealed a honeycomb structure in which almost regular hexagonal crystal grains 31 were regularly arrayed two-dimensionally, as schematically illustrated in FIG. 6. The TEM image of the surface of the magnetic layer 53 was loaded as image information into the computer which then determined the average of the size a2 of the crystal grains 21 and the grain size distribution by a method similar to that of the embodiment 1. The average size of the crystal grains 31 was 15 nm and the standard deviation σ of the grain size distribution was 1.2 nm. The grain-to-grain distance b2 was 0.5 to 1.0 nm.

Next, using a method similar to that of the embodiment 1, the number of crystal grains neighboring one crystal grain 31 was determined. Examination of 250 crystal grains showed that 6.01 grains on average surrounded each grain, which represents a good agreement with the coordination number on the surface of the substrate 51. This indicates that hexagonal magnetic crystal grains 31 of similar sizes are grown continuously from, and regularly arrayed two dimensionally over, the surface of the substrate 51 to form a honeycomb structure. These show that the crystal grains of the magnetic layer 53 are microfine and that the grain size distribution is narrow.

The observation of the cross section by TEM found that the substrate 51 using an inorganic compound and the magnetic layer 53 were epitaxially grown and that the magnetic grains of the magnetic layer 53 had the same size as those in the crystalline phase of the inorganic compound substrate 51. It was also found that the cross-sectional structure of the magnetic layer 53 was a good columnar structure and that the size of the crystal grains did not change from the substrate surface to the medium surface.

Measurement of magnetic characteristics of the magnetic layer 53 showed that the coercivity was 3.5 kOe, Isv was $2.5 \times 10^{-16}$ emu, and S, which is the measure of squareness of hysteresis in M-H loop, was 0.8 and S* was 0.86, indicating that the magnetic layer 43 has a good magnetic characteristic.

Finally, a carbon layer as a protective layer 54 was deposited over the magnetic layer 53 to a thickness of 5 nm. As to the sputtering conditions the applied DC power density was 1 kW/150 mmφ and the discharge gas pressure was 5 mTorr. Although Ar was used as a sputtering gas, a gas including nitrogen may also be used.

To the surface of the magnetic recording disk manufactured in this manner, a high molecular agent having a normal chain structure with a molar weight of 3000 or more was applied as a lubricant. The disk was then incorporated into a magnetic recording disk drive schematically shown in FIGS. 11A and 11B and the read/write characteristics of the magnetic recording disk were evaluated. For a writing operation a magnetic head having a soft magnetic layer with a high saturation magnetic flux density of 2.1T was used, and for a reading operation a magnetic head utilizing a giant magnetoresistive effect was used. The gap between the head surface and the magnetic layer was 20 nm. The S/N of the disk was examined by recording a signal equivalent to 20 $GB/inch^2$ onto the magnetic recording disk, and a read output of 32 dB was obtained. A magnetic force microscope (MFM) was used to measure a magnetization reversal unit. The magnetization reversal unit was found to be of a size equivalent to two or three magnetic grains, which is sufficiently small. It was also found that a zigzag pattern present in the magnetization transition region was significantly smaller than those found in the media of the related art.

A further test was conducted in which a signal equivalent to 20 GB/in² was written into the magnetic recording disk by using the magnetic head and in which the recorded pattern was read out immediately after the write operation and 2000 hours after the write operation and the intensities of these signals read out were compared. The intensity of the signal read out 2000 hours after the write operation was 97% of the output signal read immediately after the write operation, indicating that the recorded signal suffered almost no degradation and no attenuation caused by thermal fluctuations and thermal demagnetization. This is due to the fact that the grain size distribution in the magnetic layer is narrow. The measurement of error rate of this disk showed that it was $1 \times 10^{-5}$ or less when no signal processing was performed.

Although in this embodiment cobalt oxide was used as a material to form the crystalline phase of the inorganic compound substrate 51, the similar effects were produced when chromium oxide or nickel oxide was used instead of cobalt oxide. Further, while silicon oxide was used as a material to form the amorphous phase, the similar effects were obtained when aluminum oxide, titanium oxide, tantalum oxide or zinc oxide was used instead of silicon oxide. When there is a difference in lattice constant between the crystal grains of the inorganic compound substrate 51 and the crystal grains of the magnetic layer formed over the substrate 51, iron oxide, chromium oxide or nickel oxide may be added to the material forming the amorphous phase so as to make the lattice constant of the crystal grains of the inorganic compound substrate 51 come close to that of the crystal grains of the magnetic layer 53.

[Embodiment 7]

A magnetic recording disk whose cross-sectional structure is schematically illustrated in FIG. 5 was manufactured. As a substrate 11 for the magnetic recording disk, a glass substrate 2.5" across was used. An inorganic compound layer 12 was formed over the substrate 11 to a thickness of 30 nm by sputtering. A target used was made of a sintered mixture of CoO and $SiO_2$ in a molar ratio of 2:1. Pure argon was used as a discharge gas. The Ar pressure during sputtering was set at 3 mTorr and the applied RF power was 1 kW/150 mmϕ. While the target of a sintered mixture of CoO and $SiO_2$ was used here, it is possible to use a CoO target and an $SiO_2$ target and perform a two element simultaneous sputtering to form an inorganic compound layer 12.

The TEM observation of the surface of the inorganic compound layer 12 thus obtained revealed a honeycomb structure, in which almost regular hexagonal grains 21 were regularly arrayed two-dimensionally as schematically illustrated in FIG. 2. The examination of each phase by the μ-EDX found that the grains 21 were oxide of cobalt and what was present in the grain boundary was silicon oxide. The TEM image of the surface of the inorganic compound layer 12 was loaded as image information into the computer, which then determined the average of size a1 of the crystal grains 21 and the grain size distribution by using a method similar to that of the embodiment 1. The average size of the crystal grains 21 was 15 nm and the standard deviation σ of the grain size distribution was 1.2 nm. Next, using a method similar to that of the embodiment 1, the number of crystal grains neighboring one crystal grain 21 was determined. Examination of 250 crystal grains showed that 6.07 grains on average surrounded each grain.

The simultaneous sputtering of Co and $SiO_2$ was performed to deposit a magnetic layer 13 over the inorganic compound layer 12 to a thickness of 20 nm. Pure Ar was used as a discharge gas and two targets of Co and $SiO_2$ were used. The Ar pressure during sputtering was set at 3 mTorr and the applied RF power was 1 kW/150 mmϕ.

The TEM observation of the surface of the magnetic layer 13 thus formed revealed a honeycomb structure in which, as schematically illustrated in FIG. 6, almost regular hexagonal magnetic crystal grains 31 were regularly arranged two-dimensionally, reflecting the structure of the inorganic compound layer 12. Co was grown as the magnetic crystal grains 31 in columnar shape in areas corresponding to the crystalline phase of the inorganic compound layer 12. Surrounding these magnetic crystal grains 31, $SiO_2$ was present in the grain boundary. The TEM image of the surface of the magnetic layer 13 was loaded as image information into the computer, which then determined the average of size a2 of the crystal grains 31 and the grain size distribution by using a method similar to that of the embodiment 1. The average size of the crystal grains 31 was 15 nm and the standard deviation σ of the grain size distribution was 1.2 nm. These values are equal to those of the inorganic compound layer 12, and it is found that the grain size and the grain size distribution of the magnetic layer 13 reflect the values of the inorganic compound layer. The distance b2 between the magnetic crystal grains 31 is 1 to 2 nm, which is considered to reduce the magnetic interaction. In this way, the grain size a2 of the crystal grains 31 and the grain-to-grain distance b2 reflected the structure of the inorganic compound layer 12. Next, using a method similar to that of the embodiment 1, the number of crystal grains neighboring one magnetic crystal grain 31 was determined. Examination of 250 crystal grains showed that 6.07 grains on average surrounded each grain.

The TEM observation of the cross section of the magnetic layer 13 found that the magnetic crystal grains 31 in the magnetic layer 13 were epitaxially grown from the crystalline phase of the inorganic compound layer 12 and had a columnar cross-sectional structure. The magnetic crystal grains 31 were more likely to grow on the crystalline phase of the inorganic compound layer 12 and $SiO_2$ was grown on grain boundaries.

Finally, a carbon layer as a protective layer 14 was deposited to a thickness of 5 nm. As to the sputtering conditions, an applied DC power density was 1 kW/150 mmϕ and a discharge gas pressure was 5 mTorr. Although Ar was used as a sputtering gas, a gas including nitrogen may also be used.

Figure 10:
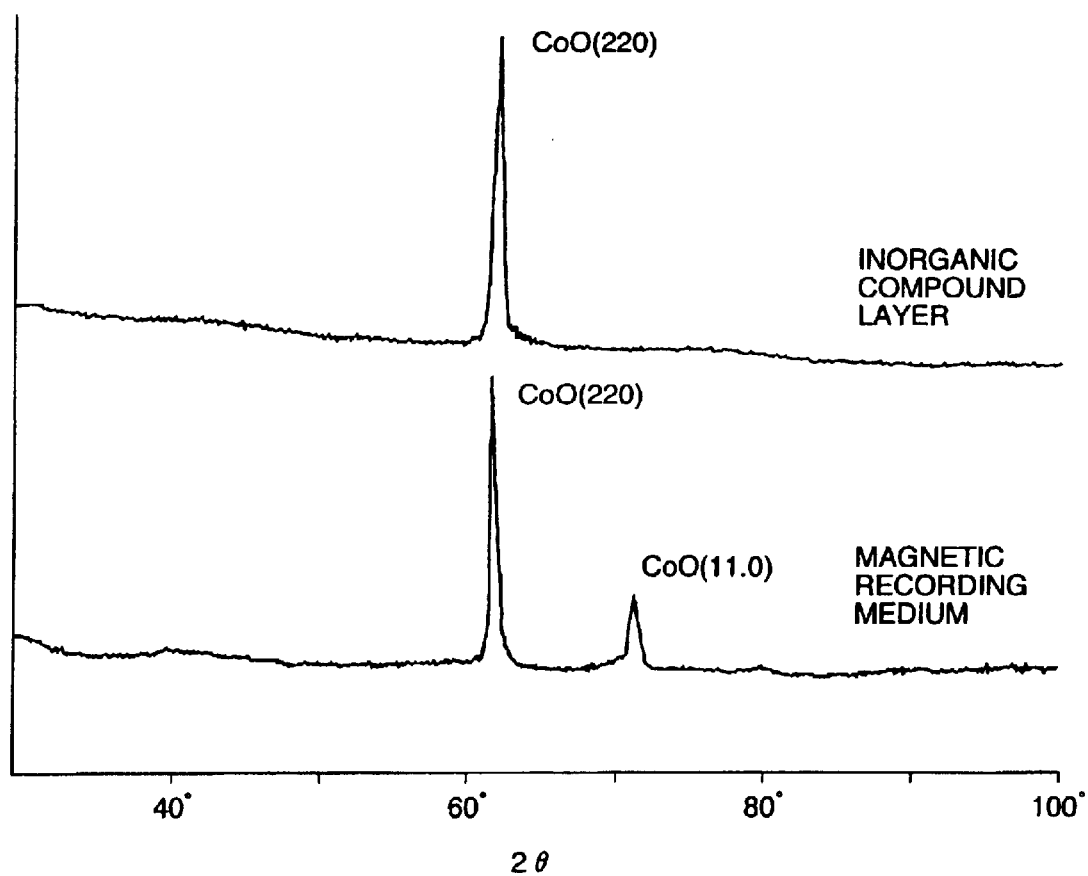
FIG. 10 is a diagram showing an X-ray diffraction profile of a magnetic recording medium.

Next, the structure of the magnetic recording disk thus manufactured was examined by the θ-2θ X-ray diffraction analysis and its X-ray diffraction profile was shown in FIG. 10. The abscissa in FIG. 10 represents an angle of 2θ and the ordinate represents a relative value of X-ray diffraction intensity. FIG. 10 also shows an X-ray diffraction profile of only the inorganic compound layer 12, shifted along the ordinate axis from another profile, for comparison. As shown, the inorganic compound layer 12 exhibited a diffraction peak at around 2θ=62.5°. This corresponds to the (220) plane of CoO in the inorganic compound layer 12. No other obvious peaks were observed.

From FIG. 10, the X-ray diffraction profile of the magnetic recording medium having a Co—$SiO_2$ layer epitaxially grown over the inorganic compound layer 12 exhibited a diffraction peak at around 2θ=74°. With the TEM observation result also taken into account, this is considered to be the result of observation of the diffraction peak from the (11.0) plane of the magnetic crystal-grains. This means that the (11.0) plane of the magnetic layer is strongly oriented to be parallel to the surface of the layer. Such an orientation of Co is the result of reflecting the orientation of the inorganic compound layer 12 because the magnetic crystal grains 31 of Co were epitaxially grown from the crystalline phase of the inorganic compound layer 12. When the magnetic layer 13 is formed directly over the substrate 11, without forming the inorganic compound layer 12, under the same sputtering conditions, the X-ray diffraction profile does not show a diffraction peak from the (11.0) plane of Co. This indicates that the inorganic compound layer 12 contributes much to the orientation control of the magnetic layer 13.

Next, the measurement of the magnetic characteristic of the magnetic layer 13 shows that the coercivity was 3.5 kOe, Isv was $2.5 \times 10^{-16}$ emu, and S, which is the measure of squareness of hysteresis in M-H loop, was 0.85 and S* was 0.90, showing that the magnetic layer 13 had a good magnetic characteristic. This reflects the fact that the crystal grain size of the magnetic layer 13 and the grain size variation are small and that the magnetic interaction among the crystal grains has decreased. It is also seen that because there are almost no microfine crystal grains, the medium has an excellent thermal decay resistance.

To the surface of the magnetic recording disk manufactured in this manner, a high molecular agent having a normal chain structure with a molar weight of 3000 or more was applied as a lubricant. The disk was then incorporated into a magnetic recording disk drive schematically shown in FIG. 11 and the read/write characteristics of the magnetic recording disk were evaluated. For a writing operation a magnetic head having a soft magnetic layer with a high saturation magnetic flux density of 2.1T was used, and for a reading operation a magnetic head utilizing a giant magnetoresistive effect was used. The gap between the head surface and the magnetic layer was 20 nm. The S/N of the disk was examined by recording a signal equivalent to 20 GB/inch$^2$ onto the magnetic recording disk, and a read output of 32 dB was obtained. A magnetic force microscope (MFM) was used to measure a magnetization reversal unit. The magnetization reversal unit was found to be of a size equivalent to two or three magnetic grains, which is sufficiently small. It was also found that a zigzag pattern present in the magnetization transition region was significantly smaller than those found in the media of the related art.

Another test was conducted in which a signal equivalent to 20 GB/in$^2$ was written into the magnetic recording disk by using the magnetic head and in which the recorded pattern was read out immediately after the write operation and 2000 hours after the write operation and the intensities of these signals read out were compared. The intensity of the signal read out 2000 hours after the write operation was 98% of the output signal read immediately after the write operation, indicating that the recorded signal suffered almost no degradation and no attenuation caused by thermal fluctuations and thermal demagnetization. This is due to the fact that the grain size distribution in the magnetic layer is narrow. The measurement of error rate of this disk showed that it was $1 \times 10^{-5}$ or less when no signal processing was performed.

Although in this embodiment cobalt oxide was used as a material forming the crystalline phase of the inorganic compound layer 12, the similar effects were obtained when iron oxide or nickel oxide was used instead of the cobalt oxide. Further, while silicon oxide was used as a material to form the amorphous phase, the similar effects were obtained when aluminum oxide, titanium oxide, tantalum oxide or zinc oxide was used instead of silicon oxide. Further, although silicon oxide was used as a material for the Co grain boundary in the magnetic layer 13, the use of aluminum oxide, titanium oxide, tantalum oxide or zinc oxide in place of the silicon oxide resulted in the similar effects. Further, the similar effects were produced when-the substrate 11 used a metal substrate of aluminum or aluminum alloy, or a substrate formed by plating NiP over glass, aluminum or aluminum alloy, or a disk substrate of various sizes.

Embodiment 8

A Co—Pt alloy-SiO$_2$ was used in the magnetic layer to form a magnetic recording disk whose cross section is schematically illustrated in FIG. 5.

As a substrate 11 for the magnetic recording disk, a glass substrate 2.5" across was used. An inorganic compound layer 12 was formed over the substrate 11 to a thickness of 30 nm by two-element simultaneous sputtering. A CoO target and a ZnO target were used, and pure argon was used as a discharge gas. The Ar pressure during sputtering was set at 3 mTorr and the applied RF power was 1 kW/150 mm$\phi$ for the CoO target and 0.5 kW/150 mm$\phi$ for the ZnO target.

The TEM observation of the surface of the inorganic compound layer 12 thus obtained revealed a honeycomb structure, in which almost regular hexagonal grains 21 were regularly arrayed two-dimensionally as schematically illustrated in FIG. 2. The examination of each phase by the $\mu$-EDX found that the crystal grains 21 were oxide of cobalt and what was present in the grain boundary was zinc oxide. The TEM image of the surface of the inorganic compound layer 12 was loaded as image information into the computer, which then determined the average of size a1 of the crystal grains 21 and the grain size distribution by using a method similar to that of the embodiment 1. The average size of the crystal grains 21 was 10 nm and the standard deviation $\sigma$ of the grain size distribution was 0.8 nm. The grain-to-grain distance b1 was 2 nm. Next, using a method similar to that of the embodiment 1, the number of crystal grains neighboring one crystal grain 21 was determined. Examination of 250 crystal grains showed that 6.03 grains on average surrounded each grain.

The simultaneous sputtering of Co$_{65}$Pt$_{35}$ and ZnO was performed to deposit a magnetic layer 13 over the inorganic compound layer 12 to a thickness of 20 nm. Pure Ar was used as a discharge gas and two targets of Co$_{65}$Pt$_{35}$ and ZnO were used. The Ar pressure during sputtering was set at 3 mTorr and the applied power was 1 kW/150 mm$\phi$ (DC) for the Co$_{65}$Pt$_{35}$ target and 0.5 kW/150 mm$\phi$ (RF) for the ZnO target.

The TEM observation of the surface of the magnetic layer 13 thus formed revealed a honeycomb structure in which, as schematically illustrated in FIG. 6, almost regular hexagonal magnetic crystal grains 31 were regularly arranged two-dimensionally, reflecting the structure of the inorganic compound layer 12. Co—Pt was grown as the magnetic crystal grains 31 in columnar shape in areas corresponding to the crystalline phase of the inorganic compound layer 12. Surrounding these magnetic crystal grains 31, there was ZnO in the grain boundary. The TEM image of the surface of the magnetic layer 13 was loaded as image information into the computer, which then determined the average of size a2 of the crystal grains 31 and the grain size distribution by using a method similar to that of the embodiment 1. The average size of the crystal grains 31 was 10 nm and the standard deviation $\sigma$ of the grain size distribution was 0.8 nm, which is significantly small.

The average grain size and the grain size distribution of the magnetic layer 13 are equal to those of the inorganic compound layer, indicating that the crystal grain size and the grain size distribution of the magnetic layer reflect the values of the inorganic compound layer. The distance b2 between the magnetic crystal grains 31 is 1 to 2 nm, which is considered to reduce the magnetic interaction. In this way, the grain size a2 of the crystal grains 31 and the grain-to-grain distance b2 reflected the structure of the inorganic compound layer 12. Next, using a method similar to that of the embodiment 1, the number of crystal grains neighboring one magnetic crystal grain 31 was determined. Examination of 250 crystal grains showed that 6.03 grains on average surrounded each grain.

Next, the measurement of the magnetic characteristic of the magnetic layer 13 shows that the coercivity was 4.3 kOe, Isv was $2.5 \times 10^{-16}$ emu, and S, which is the measure of squareness of hysteresis in M-H loop, was 0.90 and S* was 0.93, showing that the magnetic layer 13 had a good magnetic characteristic. The reason that S and S* are larger than those of the medium of the embodiment 7 is that the anisotropy of the magnetic layer 13 is larger. This reflects the fact that the crystal grain size of the magnetic layer and the grain size variation are small and that the magnetic interaction among the crystal grains has decreased. It is also seen that because there are almost no microfine crystal grains, the medium has an excellent thermal decay resistance.

Finally, a carbon layer as a protective layer 14 was deposited over the magnetic layer 13 to a thickness of 5 nm. As to the sputtering conditions, an applied DC power density was 1 kW/150 mm$\phi$ and a discharge gas pressure was 5 mTorr. Although Ar was used as a sputtering gas, a gas including nitrogen may also be used.

To the surface of the magnetic recording disk manufactured in this manner, a high molecular agent having a normal chain structure with a molar weight of 3000 or more was applied as a lubricant. The disk was then incorporated into a magnetic recording disk drive schematically shown in FIG. 11 and the read/write characteristics of the magnetic recording disk were evaluated. For a writing operation a magnetic head having a soft magnetic layer with a high saturation magnetic flux density of 2.1T was used, and for a reading operation a magnetic head utilizing a giant magnetoresistive effect was used. The gap between the head surface and the magnetic layer was 20 nm. The S/N of the disk was examined by recording a signal equivalent to 20 GB/inch$^2$ onto the magnetic recording disk, and a read output of 34 dB was obtained. A magnetic force microscope (MFM) was used to measure a magnetization reversal unit. The magnetization reversal unit was found to be of a size equivalent to two or three magnetic grains, which is sufficiently small. It was also found that a zigzag pattern present in the magnetization transition region was significantly smaller than those found in the media of the related art.

Another test was conducted in which a signal equivalent to 20 GB/in$^2$ was written into the magnetic recording disk by using the magnetic head and in which the recorded pattern was read out immediately after the write operation and 2000 hours after the write operation and the intensities of these signals read out were compared. The intensity of the signal read out 2000 hours after the write operation was 98% of the output signal read immediately after the write operation, indicating that the recorded signal suffered almost no degradation and no attenuation caused by thermal fluctuations and thermal demagnetization. This is due to the fact that the grain size distribution in the magnetic layer is narrow. The measurement of error rate of this disk showed that it was $1 \times 10^{-5}$ or less when no signal processing was performed.

Although in this embodiment cobalt oxide was used as a material forming the crystalline phase of the inorganic compound layer, the similar effects were obtained when iron oxide or nickel oxide was used instead of the cobalt oxide.

Further, while zinc oxide was used as a material to form the amorphous phase, the similar effects were obtained when aluminum oxide, titanium oxide, tantalum oxide or silicon oxide was used instead of zinc oxide. Further, although silicon oxide was used as a material for the Co—Pt grain boundary in the magnetic layer, the use of aluminum oxide, titanium oxide, tantalum oxide or zinc oxide in place of the silicon oxide resulted in the similar effects.

With this invention, by epitaxially growing a magnetic layer over the inorganic compound substrate or inorganic compound layer which has a significantly narrow distribution of grain size in the in-plane direction, it is possible to refine the magnetic crystal grains of the magnetic recording medium, control the orientation of the magnetic crystal grains, narrow the extent of the grain size distribution of the magnetic crystal grains, and arrange the magnetic crystal grains in a regular pattern. Reducing the size of the magnetic crystal grains of the magnetic layer and-narrowing the grain size distribution, in particular, have an effect of reducing noise and thermal fluctuations and thermal demagnetization when a magnetic recording disk is fabricated. Further, by controlling the orientation of the magnetic layer, it is possible to produce a magnetic layer having an orientation suited to high density recording. Because the distance between the magnetic crystal grains in the magnetic layer can be controlled, the interaction between the magnetic crystal grains can be reduced. This in turn enables reduction in the medium noise and refinement of the magnetic domain size, leading to a higher density recording. Combining these can realize an ultrahigh density magnetic recording in excess of 20 GB/inch$^2$.

What is claimed is:

1. A magnetic storage apparatus comprising:
    a magnetic recording medium comprising a substrate,
    an inorganic compound underlayer including a first oxide having a crystalline grain structure and a second oxide having a non-crystalline structure formed over the substrate, wherein the second oxide is formed along the grain boundaries of the first oxide,
    a magnetic layer formed over the underlayer;
    wherein the inorganic compound underlayer has a honeycomb structure,
    and further wherein a material contained in the inorganic compound underlayer that forms a non-crystalline portion is ⅙ or more;
    a magnetic recording medium driver for driving the magnetic recording medium;
    a magnetic head for writing into and reading from the magnetic recording medium;
    a head access system for driving the magnetic head; and
    a read/write signal processing system for processing the read/write signals to and from the magnetic head.

2. A magnetic storage apparatus according to claim 1, wherein in the inorganic compound layer, an average number of grains surrounding one grain is between 5.7 and 6.3 when viewed in a plane parallel to the substrate surface.

3. A magnetic storage apparatus according to claim 1, wherein the first oxide includes an inorganic compound material selected from the group consisting of cobalt oxide, chromium oxide, iron oxide and nickel oxide, and the second oxide includes an inorganic compound material selected from the group consisting of silicon oxide, aluminum oxide, tantalum oxide and zinc oxide.

4. A magnetic storage apparatus according to claim 1, wherein the magnetic layer has a honeycomb structure in which magnetic crystalline grains have a hexagonal structure and are regularly arranged two-dimensionally in a plane parallel to the substrate surface.

* * * * *